(12) United States Patent
Hagi et al.

(10) Patent No.: US 11,634,574 B2
(45) Date of Patent: Apr. 25, 2023

(54) RUBBER-CONTAINING GRAFT POLYMER, RESIN COMPOSITION CONTAINING RUBBER-CONTAINING GRAFT POLYMER, AND SHAPED ARTICLE OF SAME

(71) Applicant: Mitsubishi Chemical Corporation, Tokyo (JP)

(72) Inventors: Misaki Hagi, Tokyo (JP); Shinji Matsuoka, Tokyo (JP); Masashi Iimori, Tokyo (JP); Tatsuhiro Hiraoka, Tokyo (JP); Yuuta Maenaka, Tokyo (JP)

(73) Assignee: Mitsubishi Chemical Corporation, Tokyo (JP)

( * ) Notice: Subject to any disclaimer, the term of this patent is extended or adjusted under 35 U.S.C. 154(b) by 0 days.

(21) Appl. No.: 16/897,075

(22) Filed: Jun. 9, 2020

(65) Prior Publication Data

US 2020/0299502 A1 Sep. 24, 2020

Related U.S. Application Data

(63) Continuation of application No. PCT/JP2018/046754, filed on Dec. 19, 2018.

(30) Foreign Application Priority Data

Dec. 25, 2017 (JP) .............................. JP2017-247766

(51) Int. Cl.
| | | |
|---|---|---|
| C08L 67/00 | (2006.01) | |
| C08F 2/24 | (2006.01) | |
| C08F 212/08 | (2006.01) | |
| C08F 220/14 | (2006.01) | |
| C08F 220/40 | (2006.01) | |
| C08L 51/00 | (2006.01) | |
| C08F 220/18 | (2006.01) | |
| B29C 45/00 | (2006.01) | |
| C08L 69/00 | (2006.01) | |

(52) U.S. Cl.
CPC ........ C08L 51/003 (2013.01); B29C 45/0001 (2013.01); C08F 2/24 (2013.01); C08F 212/08 (2013.01); C08F 220/14 (2013.01); C08F 220/1804 (2020.02); C08F 220/40 (2013.01); C08L 67/00 (2013.01); C08L 69/005 (2013.01); *C08F 2800/20* (2013.01)

(58) Field of Classification Search
CPC ...... C08L 51/003; C08L 67/00; C08L 69/005; C08F 220/1804; C08F 2800/20; C08F 2/24; C08F 212/08; C08F 220/14; C08F 220/40; B29C 45/0001
USPC ...................................................... 524/504
See application file for complete search history.

(56) References Cited

U.S. PATENT DOCUMENTS

| | | | |
|---|---|---|---|
| 5,455,302 A | | 10/1995 | Saito et al. |
| 2005/0154140 A1 | | 7/2005 | Hong et al. |
| 2013/0131257 A1 | | 5/2013 | Sharma et al. |

FOREIGN PATENT DOCUMENTS

| | | | | |
|---|---|---|---|---|
| EP | 2377899 A1 | | 10/2011 | |
| JP | 63312343 A | * | 12/1988 | |
| JP | S63-312343 A | | 12/1988 | |
| JP | 03052950 A | * | 3/1991 | |
| JP | 03052952 A | * | 3/1991 | |
| JP | H03-052950 A | | 3/1991 | |
| JP | H03-052952 A | | 3/1991 | |
| JP | 06-200137 A | | 7/1994 | |
| JP | 08199036 A | * | 8/1996 | |
| JP | H08-199036 A | | 8/1996 | |
| JP | 2004-307849 A | | 11/2004 | |
| JP | 2004307849 A | * | 11/2004 | |
| JP | 2005-171253 A | | 6/2005 | |
| JP | 2013-527270 A | | 6/2013 | |
| JP | 2013-166895 A | | 8/2013 | |
| JP | 2013166985 A | * | 8/2013 | |
| JP | 2014-196483 A | | 10/2014 | |
| JP | 2014196483 A | * | 10/2014 | |
| JP | 2015-004051 A | | 1/2015 | |
| JP | 2015004051 A | * | 1/2015 | |

OTHER PUBLICATIONS

Daicel-PCLF Series (Year: 2016).*
Office Action issued in corresponding Korean Patent Application No. 10-2020-7014260 dated Jun. 24, 2021.
International Search Report issued in corresponding International Patent Application No. PCT/JP2018/046754, dated Mar. 26, 2019.
Extended European Search Reported issued in corresponding European Patent Application No. 18896964.6 dated Feb. 5, 2021.
Office Action issued in corresponding Japanese Application No. 2019-561570 dated Feb. 24, 2021.
Decision of Rejection dated Nov. 24, 2021, issued in corresponding Japanese Patent Application No. 2019-561570.

(Continued)

*Primary Examiner* — Kelechi C Egwim

(74) *Attorney, Agent, or Firm* — Morgan, Lewis & Bockius LLP

(57) ABSTRACT

Provided is a rubber-containing graft polymer which is excellent in mechanical strength such as weld strength or impact strength, required as a rubber-containing graft polymer. A rubber-containing graft polymer (A) of the present invention is a rubber-containing graft polymer having a graft chain, in which when the rubber-containing graft polymer is mixed with an organic solvent and separated into an organic solvent insoluble component and an organic solvent soluble component, a caprolactone unit is contained in a graft chain contained in the organic solvent insoluble component.

11 Claims, 3 Drawing Sheets

(56) References Cited

OTHER PUBLICATIONS

Office Action issued in corresponding Chinese Patent Application No. 201880070465.0 dated Jul. 11, 2022.

\* cited by examiner

RUBBER-CONTAINING GRAFT POLYMER, RESIN COMPOSITION CONTAINING RUBBER-CONTAINING GRAFT POLYMER, AND SHAPED ARTICLE OF SAME

This application is a continuation application of International Application No. PCT/JP2018/046754, filed on Dec. 19, 2018, which claims the benefit of the prior Japanese Patent Application No. 2017-247766, filed Dec. 25, 2017, the content of which is incorporated herein by reference.

TECHNICAL FIELD

The present invention relates to a rubber-containing graft polymer, a resin composition containing a rubber-containing graft polymer, and a shaped article of the same.

BACKGROUND ART

A rubber-containing graft polymer is obtained by graft polymerization of a vinyl monomer to a rubbery polymer. The rubber-containing graft polymer is produced by emulsion polymerization, and can be dispersed in various resins while maintaining a predetermined rubber particle size and a rubber structure. Therefore, the rubber-containing graft polymer is suitably used for a resin that is required to have impact strength.

In order to improve the impact strength of the resin, it is generally known that it is better to uniformly disperse rubber in the resin. However, the rubber itself has low compatibility with general thermoplastic resins, and it is difficult to uniformly disperse the rubber alone in the resin.

In order to improve dispersibility of the rubber in the resin, it is known that a vinyl monomer is graft-polymerized to a rubbery polymer, and methyl methacrylate is suitably used as the vinyl monomer. The reason is, for example, that the methyl methacrylate is highly compatible with a wide range of thermoplastic resins such as polycarbonate, styrene-based resin, and polyvinyl chloride resin. However, in a case where the methyl methacrylate is used in a resin, having a relatively low compatibility with the methyl methacrylate, such as a polyester resin, the dispersibility of the rubber in the resin is not sufficient, and under a normal melt-kneading condition (an extrusion condition), the rubber tends to agglomerate in the resin. In addition, when the methyl methacrylate is used in an alloy in which two or more kinds of resins are mixed, the rubber tends to be unevenly distributed in one of the resins due to a difference in compatibility with the methyl methacrylate, and sufficient impact strength cannot be obtained.

In addition, the thermoplastic resins are used in various applications such as home appliances, OA equipment, and motor vehicle parts. However, in recent years, in these applications, shaped articles have become larger or more complex, and injection molding by a multi-point gate method started to be performed. However, in the multi-point gate method, when molten resins join and fuse in a mold, a fragile portion called a weld is formed. Since the weld causes a decrease in strength, the strength of the weld portion (weld strength) is required to be improved.

Patent Literature 1 discloses an example in which a rubber-containing graft polymer obtained by graft polymerization of a vinyl monomer whose a main component is the methyl methacrylate to a butadiene rubber is blended into an alloy of a polycarbonate resin and a styrene acrylonitrile resin.

However, in a case where a graft chain is the methyl methacrylate, since dispersion of rubber in the resin is insufficient, low-temperature impact strength or weld strength is not satisfactory.

Patent Literature 2 discloses a rubber-containing graft polymer obtained by graft polymerization of glycidyl methacrylate and methyl methacrylate to a silicone rubber. The glycidyl methacrylate has an epoxy group, and is thus chemically bonded to a polycarbonate resin or a polyester resin. Therefore, it is considered that the rubber can be uniformly dispersed in the resin by copolymerizing the glycidyl methacrylate with the graft chain.

However, since the epoxy group causes cross-linking in the thermoplastic resin or the rubber-containing graft polymer, fluidity may decrease depending on the number of the epoxy groups in some cases. In addition, even when the number of the epoxy groups is adjusted, a sufficiently satisfactory mechanical strength (such as impact strength and weld strength) cannot be obtained.

Patent Literature 3 discloses a rubber-containing graft polymer obtained by graft polymerization of 2-hydroxyethyl methacrylate and methyl methacrylate to an acrylic rubber. In a case where the rubber-containing graft polymer is blended with a thermoplastic resin having an ester bond, such as a polycarbonate resin and a polyester resin, a hydroxy group of the graft chain forms a covalent bond with a chemical reaction with the ester bond portion, and there is a possibility that the rubber may be dispersed in the resin. However, improvement of the weld strength is not achieved.

CITATION LIST

Patent Literature

[Patent Literature 1] Japanese Unexamined Patent Application, First Publication No. Heisei6(1994)-200137
[Patent Literature 2] Published Japanese Translation No. 2013-527270 of the PCT International Publication
[Patent Literature 3] Japanese Unexamined Patent Application, First Publication No. 2005-171253

SUMMARY OF INVENTION

Technical Problem

According to the present invention, by incorporating a fatty acid ester, particularly a chain ester obtained by ring-opening of a lactone ring such as a caprolactone ring into a graft chain, rubber is uniformly dispersed in a thermoplastic resin containing an alloy, and it is possible to improve the strength development required for the rubber-containing graft polymer.

Solution to Problem

The present inventors studied to solve the problems, and as a result, completed the present invention.

The present invention has the following aspects.

[1] A rubber-containing graft polymer having a graft chain, in which when the rubber-containing graft polymer is mixed with an organic solvent and separated into an organic solvent insoluble component and an organic solvent soluble component, an amount of a caprolactone unit is contained in a graft chain contained in the organic solvent insoluble component.

[2] The rubber-containing graft polymer according to [1], in which in the graft chain of the organic solvent insoluble component, an amount of the caprolactone unit is 0.1 to 40 parts by mass with respect to 100 parts by mass of a component having a glass transition temperature (Tg) of 60° C. or higher.

[3] The rubber-containing graft polymer according to [2], in which in the graft chain of the organic solvent insoluble component, an amount of the caprolactone unit is 0.5 to 30 parts by mass with respect to 100 parts by mass of a component, having a glass transition temperature (Tg) of 60° C. or higher.

[4] The rubber-containing graft polymer according to [3], in which in the graft chain of the organic solvent insoluble component, the caprolactone unit is 1.5 to 20 parts by mass with respect to 100 parts by mass of a component having a glass transition temperature (Tg) of 60° C. or higher.

[5] The rubber-containing graft polymer according to [1], in which when the organic solvent insoluble component is subjected to cryogrinding, and the cryoground organic solvent insoluble component is mixed with an organic solvent and separated into an organic solvent insoluble component after the cryogrinding and an organic solvent extract after the cryogrinding, the caprolactone unit is contained in the organic solvent extract after the cryogrinding.

[6] The rubber-containing graft polymer according to [5], in which in the organic solvent extract after the cryogrinding, an amount of the caprolactone unit is 0.1 to 40 parts by mass with respect to 100 parts by mass of a component having a glass transition temperature (Tg) of 60° C. or higher.

[7] The rubber-containing graft polymer according to [6], in which in the organic solvent extract after the cryogrinding, an amount of the caprolactone unit is 0.5 to 30 parts by mass with respect to 100 parts by mass of a component having a glass transition temperature (Tg) of 60° C. or higher.

[8] The rubber-containing graft polymer according to [7], in which in the organic solvent extract after the cryogrinding, an amount of the caprolactone unit is 1.5 to 20 parts by mass with respect to 100 parts by mass of a component having a glass transition temperature (Tg) of 60° C. or higher.

[9] The rubber-containing graft polymer according to [1], in which when the organic solvent insoluble component is subjected to an ozone addition reaction, and an ozone-added organic solvent insoluble component is mixed with an organic solvent and separated into an organic solvent insoluble component after the ozone addition reaction and an organic solvent extract after the ozone addition reaction, the caprolactone unit is contained in the organic solvent extract after the ozone addition reaction.

[10] The rubber-containing graft polymer according to [9], in which in the organic solvent extract after the ozone addition reaction, an amount of the caprolactone unit is 0.1 to 40 parts by mass with respect to 100 parts by mass of a component having a glass transition temperature (Tg) of 60° C. or higher.

[11] The rubber-containing graft polymer according to [10], in which in the organic solvent extract after the ozone addition reaction, an amount of the caprolactone unit is 0.5 to 30 parts by mass with respect to 100 parts by mass of a component having a glass transition temperature (Tg) of 60° C. or higher.

[12] The rubber-containing graft polymer according to [11], in which in the organic solvent extract after the ozone addition reaction, an amount of the caprolactone unit is 1.5 to 20 parts by mass with respect to 100 parts by mass of a component having a glass transition temperature (Tg) of 60° C. or higher.

[13] A rubber-containing graft polymer which is obtained by emulsion graft polymerization of 5% to 50% by mass of a monomer for grafting (b) containing a vinyl monomer (f-1) represented by Formula (1) to 50% to 95% by mass of rubber latex, $$CH_2=CR^1COO(CH_2)_qO[CO(CH_2)_mO]_nH \quad (1)$$

(in the formula, $R^1$ represents hydrogen or a methyl group, q represents an integer of 2 to 5, m represents an integer of 3 to 10, and n represents an integer of 1 to 10).

[14] The rubber-containing graft polymer according to [13], in which the vinyl monomer (f-1) is a vinyl monomer (f-2) represented by Formula (2), $$CH_2=CR^2COO(CH_2)_qO[CO(CH_2)_5O]_nH \quad (2)$$

(in the formula, $R^2$ represents hydrogen or a methyl group, q represents an integer of 2 to 5, and n represents an integer of 1 to 5).

[15] The rubber-containing graft polymer according to [13] or [14], in which the monomer for grafting (b) contains methyl methacrylate.

[16] The rubber-containing graft polymer according to any one of [13] to [15], in which an amount of the vinyl monomer (f-1) is 0.5% to 50% by mass with respect to 100% by mass of the rubber-containing graft polymer.

[17] The rubber-containing graft polymer according to any one of [1] to [16], in which a particle size of the rubber to be grafted is 50 to 400 nm.

[18] A resin composition containing a rubber-containing graft polymer, the composition including: the rubber-containing graft polymer according to any one of [1] to [17]; and a thermoplastic resin (B).

[19] The resin composition containing a rubber-containing graft polymer according to [18], in which the thermoplastic resin (B) is a polyester resin.

[20] The resin composition containing a rubber-containing graft polymer according to [18], in which the thermoplastic resin (B) is an alloy of an aromatic polycarbonate resin and a polyester resin.

[21] The resin composition containing a rubber-containing graft polymer according to [18], in which the thermoplastic resin (B) is an alloy of an aromatic polycarbonate resin and a styrene-based resin.

[22] A shaped article which is obtained by shaping the resin composition containing a rubber-containing graft polymer according to any one of [18] to [21].

[23] The shaped article according to [22], which is an injection shaped article.

Advantageous Effects of Invention

The rubber-containing graft polymer of the present invention can be uniformly dispersed in a thermoplastic resin containing an alloy, in a rubber particle size of 50 nm to 400 nm, which was difficult in the related art. As a result, the rubber-containing graft polymer is excellent in mechanical strength such as weld strength or impact strength, required as a rubber-containing graft polymer.

The resin composition containing a rubber-containing graft polymer of the present invention includes the rubber-containing graft polymer of the present invention. Therefore, the rubber-containing graft polymer can be uniformly dispersed in a resin composition and a shaped article obtained by shaping the resin composition containing the rubber-containing graft polymer of the present invention is excellent in mechanical strength.

DESCRIPTION OF EMBODIMENTS

Figure 1:
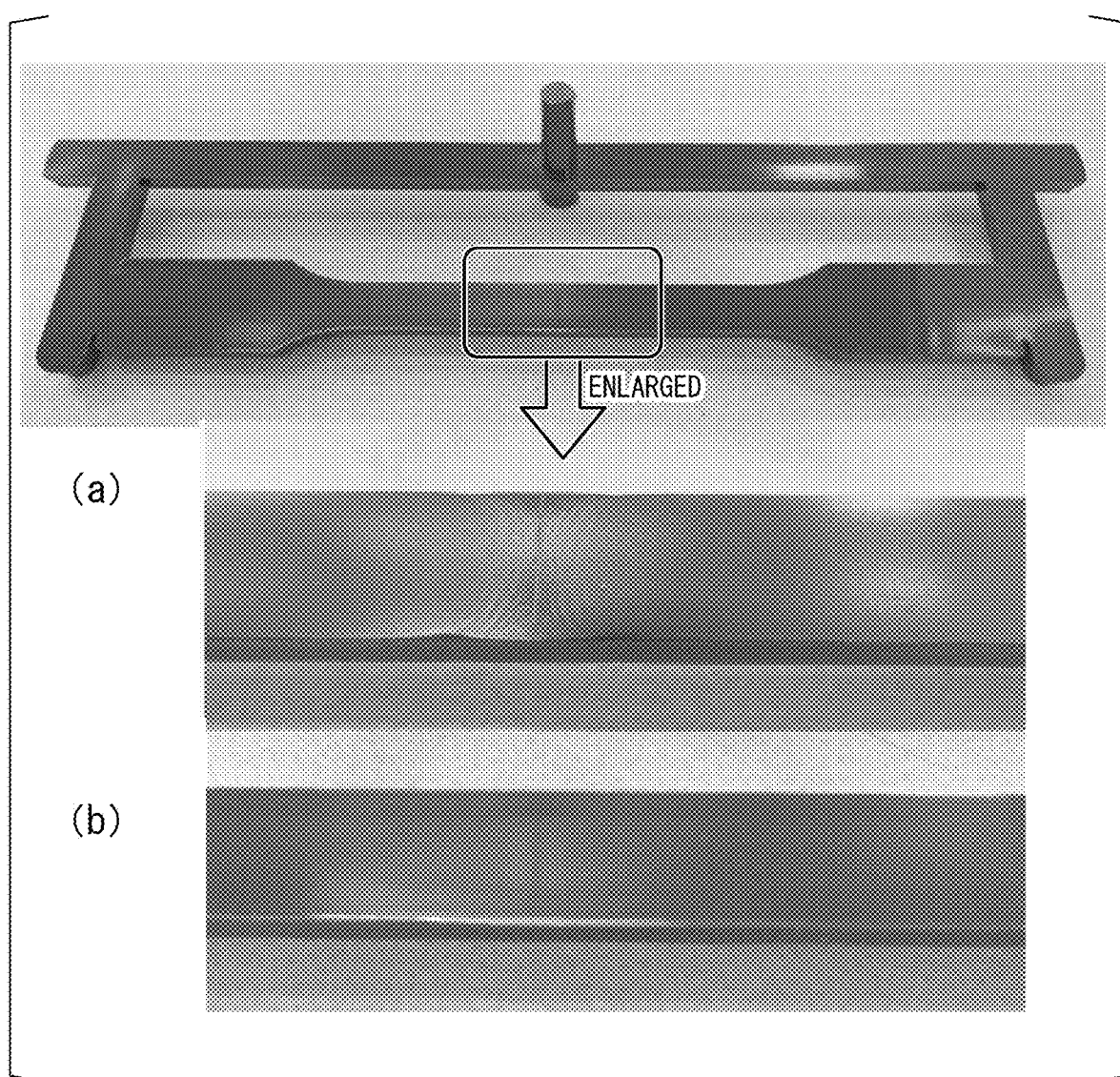
FIG. 1 is a photograph showing an appearance for illustrating conditions when obtaining a test piece for measuring weld strength from pellets of a resin composition of each example or each comparative example.

Hereinafter, embodiments of the present invention will be described in detail.
[Rubber-Containing Graft Polymer (A)]

A rubber-containing graft polymer of the present invention (hereinafter, also referred to as a "rubber-containing graft polymer (A)") is (graft latex) obtained by graft polymerization of a vinyl monomer to a rubbery polymer (rubber latex).

For example, the rubber-containing graft polymer is obtained by graft polymerization of a monomer for grafting (b) to a rubbery polymer obtained in an aqueous medium, in the presence of an emulsifier, and can be produced by emulsion polymerization.

In the present invention, the "graft chain" is a vinyl polymer or a vinyl copolymer formed by graft polymerization of the monomer for grafting (b), which is chemically bonded to a rubber cross-linking component of a rubbery polymer to be described later.
(Rubbery Polymer)

As a rubbery polymer that can be used in the present invention, those having a glass transition temperature of 0° C. or lower can be used.

When the glass transition temperature of the rubbery polymer is 0° C. or lower, impact strength represented by a value of a Charpy impact test of a shaped article obtained from a resin composition of the present invention is improved.

Specific examples of the rubbery polymer include the followings.

Butadiene rubber, styrene-butadiene copolymer rubber, silicone rubber, silicone-acrylic composite rubber (obtained by polymerizing one or more vinyl monomers containing acrylate in the presence of a rubbery polymer obtained from a monomer mainly including a dimethylsiloxane), acrylonitrile-butadiene copolymer rubber, acrylic rubber such as polybutyl acrylate, polyisoprene, polychloroprene, ethylene-propylene rubber, ethylene-propylene-diene terpolymer rubber, a block copolymer such as styrene-butadiene block copolymer rubber and styrene-isoprene block copolymer rubber, hydrogenated products thereof, and the like.

In a cold region, it is necessary to improve impact strength of a shaped article at a lower temperature (−20° C. or lower). Therefore, butadiene rubber, styrene-butadiene copolymer rubber, and silicone-acrylic composite rubber, which have a glass transition temperature of −20° C. or lower are preferable.

A content rate of the rubbery polymer in the rubber-containing graft polymer (A) (100%) is preferably in a range of 50% to 95% by mass, more preferably 70% to 94% by mass, still more preferably 75% to 93% by mass, particularly preferably 77% to 92% by mass, and most preferably 80% to 91% by mass, from a viewpoint of the impact strength of a shaped article.
(Graft Component)

Dispersibility of the rubber-containing graft polymer in a thermoplastic resin varies greatly depending on a composition of a graft chain.

Hereinafter, a component derived from graft polymerization (a component formed by graft polymerization of the monomer for grafting (b) to a rubbery polymer) which forms the rubber-containing graft polymer (A) is also referred to as a "graft component".

The rubber-containing graft polymer (A) of the present invention preferably contains, in the graft component, a unit derived from a vinyl monomer having a ring-opened lactone moiety.

The vinyl monomer having a ring-opened lactone moiety is preferably a vinyl monomer (f-1) represented by the Formula (1).

$$CH_2=CR^1COO(CH_2)_qO[CO(CH_2)_mO]_nH \quad (1)$$

(In the formula, $R^1$ represents hydrogen or a methyl group, q represents an integer of 2 to 5, m represents an integer of 3 to 10, and n represents an integer of 1 to 10.)

The graft component of the rubber-containing graft polymer (A) is preferably formed of a copolymer of the vinyl monomer (f-1) represented by Formula (1) and another vinyl monomer. Since such a copolymer has the ring-opened lactone moiety at an end of a side chain, a primary hydroxyl group having excellent reactivity is located at the end of the side chain. When changing a copolymerization ratio of the vinyl monomer (f-1) represented by Formula (1), it is possible to change the reactivity with a thermoplastic resin and to adapt the rubber-containing graft polymer (A) to various applications.

Since the copolymer of the vinyl monomer (f-1) represented by Formula (1) and another vinyl monomer has a repeating structure of the ring-opened lactone on the side chain, the hydroxyl group at the end of the side chain is present at a position away from the main chain, and easily reacts with the thermoplastic resin. In a case where hydroxyalkyl (meth)acrylate including 2-hydroxyethyl methacrylate or 2-hydroxypropyl methacrylate having a hydroxyl group at an end of a side chain is used instead of the vinyl monomer (f-1) represented by Formula (1), the hydroxyl group at the end of the graft chain is located near a main chain skeleton. Therefore, the reactivity of the hydroxyl group is poor. In addition, since the 2-hydroxyethyl methacrylate has very high water solubility, it is difficult to perform emulsion polymerization thereon.

As the vinyl monomer (f-1), a caprolactone-modified vinyl monomer is preferable from view of reactivity with a thermoplastic resin, and particularly, a vinyl monomer (f-2) represented by Formula (2), which is modified with caprolactone is suitably used.

$$CH_2=CR^2COO(CH_2)_qO[CO(CH_2)_5O]_nH \quad (2)$$

(In the formula, $R^2$ represents hydrogen or a methyl group, q represents an integer of 2 to 5, and n represents an integer of 1 to 5.)

The vinyl monomer (f-2) represented by Formula (2) is obtained by an addition reaction of a hydroxyl group-containing polymerizable unsaturated monomer and ε-caprolactone.

q is preferably an integer of 2 or 3, and more preferably 2.

Hereinafter, in the vinyl monomer (f-2), a moiety derived from the ε-caprolactone ($—CO(CH_2)_5O—$) is referred to as a "caprolactone unit (CL)".

As another vinyl monomer, contained in the monomer for grafting (b) to be copolymerized with the vinyl monomer (f-1) or the vinyl monomer (f-2), it is preferable to select a vinyl monomer having a glass transition temperature of preferably 60° C. or higher, more preferably 70° C. or higher, and still more preferably 80° C. to 120° C., from a viewpoint of characteristics of a powder (fluidity of a powder or a particle size) obtained from a subsequent coagulation step.

Examples of another vinyl monomer include methyl methacrylate, styrene, or acrylonitrile, and these may be mixed. Another vinyl monomer is particularly preferably methyl methacrylate.

In the vinyl monomer mixture, a vinyl monomer may further contained as long as the amount thereof is within 5% by mass with respect to total mass of the monomer for grafting (b) to be graft-polymerized to the rubbery polymer. Examples of such a vinyl monomer include aromatic vinyl compounds such as styrene or α-methylstyrene; acrylic esters such as methyl acrylate and butyl acrylate; and methacrylic esters such as ethyl methacrylate, and these may be copolymerized with methyl methacrylate. For example, a copolymer of methyl methacrylate and butyl acrylate is suitably used.

When including, in the "graft chain", a unit derived from the vinyl monomer (f-1), particularly a unit derived from the vinyl monomer (f-2), impact resistance and weld strength of the thermoplastic resin composition can be improved. This is because the graft chain including the unit derived from the vinyl monomer (f-1), particularly the unit derived from the vinyl monomer (f-2) can form a covalent bond with various functional groups such as an ester bond and a carbonate bond ($—O—C(O)—O—$) and because excellent compatibility with many thermoplastic resins such as polyester and polycarbonate is exhibited due to an ester bond between a carbon-carbon bond the ring-opened lactone moiety.

Further, generally used polyesters and polyols are susceptible to hydrolysis due to the ester bond. However, in the rubber-containing graft polymer of the present invention, the copolymer including, in the "graft chain", the unit derived from the vinyl monomer (f-1), particularly the unit derived from the vinyl monomer (f-2). Accordingly, a structure of polycaprolactone most excellent in water resistance among polyesters is present at the end of the side chain of the graft chain. Therefore, the rubber-containing graft polymer of the present invention exhibits excellent hydrolysis resistance.

In the rubber-containing graft polymer (100% by mass), a content rate of the unit derived from the monomer for grafting (b) is preferably 5% to 50% by mass, more preferably 9% to 40% by mass, and still more preferably 11% to 30% by mass, from the viewpoint of dispersibility of the rubber-containing graft polymer (A) in the resin and impact strength of a shaped article.

When the total mass of the units derived from the vinyl monomer for grafting (b) is 100% by mass, a content rate of the vinyl monomer (f-1) and the vinyl monomer (f-2) is preferably 0.5% to 51% by mass, more preferably 1.0% to 40% by mass, and still more preferably 2.5% to 30% by mass.

The rubbery polymer includes a rubber cross-linking component which is a component having cross-linking and insoluble in an organic solvent and a rubber non-cross-linking component which is a component polymerized without cross-linking. It is preferable that a content rate of the rubber cross-linking component in the rubbery polymer is higher.

The graft chain in the rubber-containing graft polymer of the present invention is a polymer having the unit derived from the monomer for grafting (b), which is chemically bonded to a rubber cross-linking component in the rubbery polymer.

The monomer for grafting (b) used for graft polymerization can be classified to a "vinyl monomer mgp" which is chemically bonded to the rubbery polymer in practical, a "vinyl monomer mfp", which is polymerized without chemically bonding to the rubbery polymer to form a free polymer, and a "vinyl monomer mfm", which does not undergo polymerization reaction. In the vinyl monomer mgp which is chemically bonded to the rubbery polymer, a vinyl monomer for grafting which is chemically bonded to the component "rubber cross-linking component" having cross-linking and insoluble in an organic solvent is defined as the "graft chain" of the present invention (a graft chain in "Rg" to be described later). In the vinyl monomer mgp, it is preferable that a content rate of the vinyl monomer which is chemically bonded to the component "rubber cross-linking component" having cross-linking and insoluble in an organic solvent is higher.

In the vinyl monomer mgp which is chemically bonded to the rubbery polymer in the rubber-containing graft polymer (A), when the amount of the vinyl monomer chemically bonded to the "rubber cross-linking component" is large, rubber is easily dispersed in a thermoplastic resin (B) to be described later, and also, interface strength between the thermoplastic resin (B) and the rubber improves. The better dispersibility of the rubber-containing graft polymer (A) and the higher the interface strength, the further the impact strength of the shaped article improves, which is preferable.

Almost all the vinyl monomer mfm that does not undergo the polymerization reaction is removed in a subsequent recovery step (a coagulation or spray recovery step and a drying step of an obtained powder, which will be described later).

The rubber-containing graft polymer (A) of the present invention is formed of the following five components.

Rg: Rubber cross-linking component and graft chain derived from monomer for grafting (b) chemically bonded thereto R0: Non-grafted rubber cross-linking component Ng: Non-cross-linking rubber component and graft chain derived from monomer for grafting (b) chemically bonded thereto N0: Non-grafted rubber non-cross-linking component "Free polymer Pf": Polymer or copolymer derived from monomer for grafting (b), which is non-grafted to rubbery polymer Organic solvent insoluble components of the rubber-containing graft polymer (A) are components (Rg+R0) derived from the rubber cross-linking component.

It is preferable that the graft chain derived from the monomer for grafting (b) chemically bonded in Rg contains the component derived from the vinyl monomer (f-1), and that the component derived from the vinyl monomer (f-1) is a component derived from the vinyl monomer (f-2).

The rubber-containing graft polymer (A) can be separated into an organic solvent insoluble component and an organic solvent soluble component, by mixing with an organic solvent.

An organic solvent that can be used for separation into the organic solvent insoluble component and the organic solvent soluble component does not chemically change the rubber-containing graft polymer (A) and is not particularly limited, as long as the solvent has sufficient solubility in each polymer forming the rubber-containing graft polymer (A), in a case of non-cross-linking. Examples thereof can include, preferably, acetone and tetrahydrofuran.

From a viewpoint of workability, acetone is preferable in that the volatility is high and the solvent is easily distilled off. However, since acetone has low solubility in the polymer mainly containing styrene, in a case where the rubber-containing graft polymer (A) contains a structural unit derived from styrene, tetrahydrofuran is preferable.
(Method of Measuring Organic Solvent Soluble Component and Organic Solvent Insoluble Component)

The organic solvent insoluble component of the rubber-containing graft polymer (A) can be quantified in a manner that a precisely weighed rubber-containing graft polymer sample and an organic solvent are sufficiently mixed and allowed to stand, and then an operation of separating the organic solvent soluble component and the organic solvent insoluble component from each other by centrifugation is performed multiple times to remove the organic solvent from a combined organic solvent insoluble component.

As specific examples of a method of measuring the organic solvent soluble component and the organic solvent insoluble component of the rubber-containing graft polymer (A), an example using acetone as an organic solvent will be described. In a case were an organic solvent other than acetone is used as the organic solvent, the measurement can be performed according to the following example, using acetone in place of the organic solvent.

1 g of the rubber-containing graft polymer sample (this mass is referred to as [W0] (g)) is precisely weighed in a 50 mL sample vial, 30 mL of acetone is added thereto, and a lid is closed. Stirring is performed by hand, and then, the mixture is allowed to stand for 8 hours. Using a centrifuge (Hitachi high-speed cooling centrifuge (CR21G), manufactured by Hitachi Koki Co., Ltd.), centrifugation is performed at a temperature of 4° C. for 60 minutes at a rotation speed of 14,000 rpm to separate the mixture into a soluble component and an insoluble component. However, in a case where acetone is cloudy after performing the centrifugation at a rotation speed of 14,000 rpm for 60 minutes, centrifugation is performed at a rotation speed of 14,000 rpm for 300 minutes, and the soluble component and the insoluble component are separated from each other in a state where acetone is not cloudy. In the case where the centrifugation is performed at a rotation speed of 14,000 rpm for 60 minutes, an operation in which 30 mL of acetone is added again to the obtained insoluble component to be dispersed, and the mixture is centrifuged by a centrifuge to separate the soluble component and the insoluble component from each other is repeated three times. After the centrifugation, the insoluble component is set in an inert oven (DN610I, manufactured by Yamato Scientific co., ltd.) under a nitrogen atmosphere, and heated at 40° C. for 10 hours or longer to remove acetone. Then, it is vacuum-dried at 40° C., and the insoluble component is weighed (this mass is referred to as [W1] (g)). From the result, a rate of acetone insoluble component (organic solvent insoluble component) is determined by the following formula.

$$\text{Acetone insoluble component (\% by mass)} = ([W1]/[W0]) \times 100$$

When the content rate of the organic solvent insoluble component in 100% by mass of the rubber-containing graft polymer (A) is 91% to 99.5% by mass and preferably 95% to 99.5% by mass, it can be determined that the amount of the "rubber non-cross-linking component" is sufficiently small, and the graft chain can be considered to have the same polymer as of the "free polymer Pf" (non-grafted to the rubbery polymer). In this case, the rubber-containing graft polymer (A) can be considered to be formed of the Rg and the "free polymer Pf".

In a case where the graft chain can be considered to be the same as the organic solvent soluble component, the rubber-containing graft polymer (A) has, in the "free polymer Pf", a unit derived from a ring-opened lactone (specifically, a caprolactone unit (CL)). When these units including the caprolactone unit (CL) are in the graft chain, dispersibility of the rubber improves.

According to one embodiment of the rubber-containing graft polymer (A) of the present invention, in an organic solvent extract obtained by subjecting the organic solvent insoluble component of the rubber-containing graft polymer (A) to cryogrinding and then extracting with an organic solvent (hereinafter referred to as an "organic solvent extract (fw) after the cryogrinding"), the caprolactone unit (CL) is included.

When cryogrinding the organic solvent insoluble component of the rubber-containing graft polymer (A), the rubber-containing graft polymer (A) is decomposed and crosslinked graft chains can be extracted preferentially. Using the cryogrinding, the crosslinked graft chains and a part of the crosslinked rubber are extracted with an organic solvent. In other words, the fact that the caprolactone unit (CL) is included in the organic solvent extract (fw) after the cryogrinding means that the caprolactone unit (CL) is contained in the graft chain of the rubber-containing graft polymer (A). When including, in the graft chain, the caprolactone unit (CL), dependence of mechanical strength represented by impact strength on molding processing can be reduced.

In the organic solvent extract (fw) after the cryogrinding, a ratio of the caprolactone unit (CL) is preferably 0.1 to 40 parts by mass, further preferably 0.5 to 30 parts by mass, and particularly preferably 1.5 to 20 parts by mass, to 100 parts by mass of a component having a glass transition temperature (Tg) of 60° C. or higher.

When in the organic solvent extract (fw) after the cryogrinding, the ratio of the caprolactone unit (CL) to 100 parts by mass of the component, having a glass transition temperature (Tg) of 60° C. or higher is equal to or more than the lower limit, a functional group reacts with a matrix resin and the rubber is uniformly dispersed in the resin. Therefore, an excellent mechanical property is easily exhibited. When in the organic solvent extract (fw) after the cryogrinding, the ratio of the caprolactone unit (CL) to 100 parts by mass of the component having a glass transition temperature (Tg) of 60° C. or higher is equal to or less than the upper limit, Tg of the graft component does not become too low, and it is easy to suppress that the subsequent coagulation step becomes difficult.

The organic solvent extract (fw) after the cryogrinding can be quantified in a manner that an organic solvent insoluble component of a precisely weighed rubber-containing graft polymer is cryoground and then the cryoground organic solvent insoluble component is mixed with an organic solvent and allowed to stand, an operation of separating the soluble component and the insoluble component from each other by centrifugation is performed multiple times, and the organic solvent is removed from a combined soluble component.

As specific examples of a method of extracting the organic solvent extract (fw) after the cryogrinding, an example using acetone as an organic solvent will be described. In a case where an organic solvent other than acetone is used as the organic solvent, the measurement can be performed according to the following example, using acetone in place of the solvent.

Using a 6751 vial (polycarbonate tube, steel end plug and styrol impactor) as a grinding container, 0.9 g of an organic solvent insoluble component of the rubber-containing graft polymer is cryoground (product name: SPEX6750 FREEZER/MILL, manufactured by SPEX CertiPrep Ltd, Condition: Pre-cooling 15 minutes, grinding time 2 minutes (20 times/sec), cooling for 2 minutes of cooling time, and 4 cycles). 100 mg of cryoground organic solvent insoluble component is weighed, transferred to a 50 mL vial, and further stirred by adding 30 mL of acetone thereto, and then allowed to stand for 10 hours. The soluble component and the insoluble component are separated from each other by performing centrifugation using a centrifuge (Hitachi high-speed cooling centrifuge (CR22N), manufactured by Hitachi Koki Co., Ltd.) at a temperature of 4° C. for 60 minutes at a rotation speed of 12,000 rpm. 30 mL of acetone is again added and dispersed to the obtained insoluble component, and centrifugation is performed by a centrifuge to separate the mixture into a soluble component and an insoluble component. The soluble component and the insoluble component are dried respectively, in an inert oven at 40° C. for 10 hours or longer under nitrogen.

Among these, the soluble matter was dried to obtain the organic solvent extract (fw) after the cryogrinding of the rubber-containing graft polymer. In the cryogrinding, it is necessary to grind the rubber-containing graft polymer at a ratio equal to or lower than the ratio of the component having a glass transition temperature of 60° C. or higher in the charged compositions. In a case where the charged compositions are unknown, a ratio of the component having a glass transition temperature of 60° C. or higher, which is in the organic solvent insoluble component is measured by solid-state NMR, and grinding is performed within a range not exceeding the ratio.

In a case where the rubber-containing graft polymer (A) is a diene-based rubber-containing graft polymer, the caprolactone unit (CL) is included in the organic solvent extract obtained by further subjecting the organic solvent insoluble component of the rubber-containing graft polymer (A) to an ozone addition reaction and extraction with an organic solvent (hereinafter, referred to as an organic solvent extract (ow) after the ozone addition reaction).

In the diene-based rubber-containing graft polymer, the rubber-containing graft polymer is decomposed by the ozone addition reaction, and the crosslinked graft chain can be selectively extracted. In other words, the fact that the caprolactone unit (CL) is included in the organic solvent extract (ow) after the ozone addition reaction means that the caprolactone unit (CL) is contained in the graft chain of the rubber-containing graft polymer. When including, in the graft chain, the caprolactone unit (CL), dependence of mechanical strength represented by impact strength on molding processing can be reduced.

In the organic solvent extract (ow) after the ozone addition reaction, a ratio of the caprolactone unit (CL) is preferably 0.1 to 40 parts by mass, further preferably 0.5 to 30 parts by mass, and particularly preferably 1.5 to 20 parts by mass, to 100 parts by mass of a component having a glass transition temperature (Tg) of 60° C. or higher. When in the organic solvent extract (ow) after the ozone addition reaction, the ratio of the caprolactone unit (CL) to 100 parts by mass of the component, having a glass transition temperature (Tg) of 60° C. or higher is equal to or more than the lower limit, a functional group reacts with a matrix resin and the rubber is uniformly dispersed in the resin. Therefore, an excellent mechanical property is easily exhibited. When in the organic solvent extract (ow) after the ozone addition reaction, the ratio of the caprolactone unit (CL) to 100 parts by mass of the component having a glass transition temperature (Tg) of 60° C. or higher is equal to or less than the upper limit, Tg of the graft component does not become too low, and it is easy to suppress that the subsequent coagulation step becomes difficult.

Separation (isolation) of the graft chain of the organic solvent insoluble component of the diene-based rubber-containing graft polymer by the ozone addition reaction is performed by the following operations (1) to (9).

(Ozone Addition Reaction)

(1) 6% by mass of the organic solvent insoluble component of the diene-based rubber-containing graft polymer and 94% by mass of 1:1 mixed liquid of chloroform and methylene chloride are prepared to obtain a dispersion solution.

(2) The solution was placed in an ozone absorption bottle and the bottle is immersed in a dry ice-methanol solution prepared to be −60° C. or lower.

(3) An ozone gas generated from an ozone generator is blown to the absorption bottle to add ozone.

(4) After adding ozone (the absorbing liquid becomes blue), excess ozone is removed by blowing air.

(5) In a beaker, a solution of 10% by mass of a reducing agent (sodium borohydride) and 90% by mass of methanol are prepared, and stirred with a magnetic stirrer. After dissolution, the absorbing liquid of (4) was placed thereto and stirred for 3 hours or longer.

(6) After stirring, a hydrochloric acid aqueous solution (1:1=hydrochloric acid:water) having a mass equivalent to ⅕ of the mass of the solution of (5) is added to the solution of (5), and the mixture is stirred for 3 hours or longer.

(7) After stirring, the mixture is transferred to a separatory funnel and separated into two layers. The lower layer is drained into an eggplant flask.

(8) The eggplant flask is set in a constant temperature bath at 65° C. and volatiles are distilled off using an evaporator.

(9) A residue in the eggplant flask is vacuum-dried at 65° C. for 8 hours or longer to obtain the organic solvent extract (ow) after the ozone addition reaction of the rubber-containing graft polymer.

(Composition Analysis of Organic Solvent Extract after Cryogrinding and Organic Solvent Extract after Ozone Addition Reaction)

Polymer composition analysis and quantification of the caprolactone unit (CL) can be performed by subjecting the organic solvent extract (fw) after the cryogrinding or the organic solvent extract (ow) after the ozone addition reaction to pyrolysis GC-MS (gas chromatography mass spectrometer, pyrolysis temperature of 500° C.).

A volume average particle diameter (Dv) of the rubbery polymer that can be used in the present invention is preferably 50 to 400 nm, more preferably 50 to 300 nm, and still more preferably 70 to 250 nm.

When the particle size of the rubbery polymer is within the above range, it is easy to make a shaped appearance favorable without scattering of light, stress relaxation by the rubber becomes sufficient, and it is also easy to achieve a sufficient value of the impact strength.

The volume average particle size can be measured by a nanoparticle size distribution measuring apparatus using a light scattering method or a capillary particle size distribution meter using capillary hydrodynamic fractionation (CHDF method), and is preferably measured by the light scattering method.

The volume average particle size of the rubbery polymer can be adjusted by adjusting the amount of an emulsifier in production of the rubbery polymer by emulsion polymerization.

A particle size distribution of the rubbery polymer is preferably small, specifically, preferably 1.5 or less. The particle size distribution can be quantified by a ratio (Dv/Dn) between the volume average particle size (Dv) and a number average particle size (Dn).

The particle size distribution can be reduced by adjusting the amount of the emulsifier in the production of the rubbery polymer by emulsion polymerization. In order to make the particle size distribution 1.5 or less, it is preferable to produce the rubbery polymer by emulsion polymerization.

The volume average particle size of the powder containing the rubber-containing graft polymer (A) of the present invention is preferably 300 to 500 µm.

When the particle size of the powder is within the range of 300 to 500 µm, scattering can be suppressed at the time of blending or charging into a mixing device when preparing a resin composition, a concern that a problem such as dust explosion may occur is reduced. Further, the flow characteristic of the powder is favorable, and a problem such as clogging of a pipe in a production step is unlikely to occur.
(Polymerization Initiator)

A polymerization initiator used at the time of the graft polymerization of the rubber-containing graft polymer of the present invention is not particularly limited, and known polymerization initiators can be used. That is, a thermal decomposition type polymerization initiator such as 2,2'-azobisisobutyronitrile, hydrogen peroxide, potassium persulfate, and ammonium persulfate can be used. In addition, the polymerization initiator can be used as a redox polymerization initiator in which a peroxide such as an organic peroxide such as t-butyl peroxyisopropyl carbonate, paramenthane hydroperoxide, cumene hydroperoxide, dicumyl peroxide, t-butyl hydroperoxide, di-t-butyl peroxide, and t-hexyl peroxide or an inorganic peroxide such as a hydrogen peroxide, potassium persulfate, and an ammonium persulfate; as needed, a reducing agent such as sodium formaldehyde sulfoxylate and glucose; as needed, a transition metal salt such as iron (II) sulfate; as needed, a chelating agent such as disodium ethylenediaminetetraacetate; and as needed, a phosphorus-based flame retardant such as sodium pyrophosphate are used in combination.

In addition, in a case where it is necessary to adjust the weight average molecular weight (Mw) of the graft chain, a general method such as adjustment of amounts of a chain transfer agent and an initiator to be used in the polymerization and adjustment of the polymerization temperature can be used. Examples of the chain transfer agent include alkyl mercaptans such as n-octyl mercaptan and t-dodecyl mercaptan.
(Acrylic Rubbery Polymer)

In a case where a rubbery polymer used for the rubber-containing graft polymer (A) of the present invention is an acrylic rubber, an acrylic rubbery polymer (13-1) is preferably a (meth)acrylic acid alkyl ester copolymer obtained by polymerizing 50% to 100% by mass of a (meth)acrylic acid alkyl ester monofunctional monomer (b-1) (hereinafter, referred to as a monomer (b-1)), 0% to 50% by mass of a monofunctional monomer (b-2) (hereinafter, referred to as a monomer (b-2)) polymerizable with the monomer (b-1), and 0% to 5% by mass of a polyfunctional monomer (b-3) (hereinafter, referred to as a monomer (b-3)) so that the total mass becomes 100% by mass.

Examples of the monomer (b-1) include an alkyl acrylate monomer such as methyl acrylate, ethyl acrylate, n-propyl acrylate, n-butyl acrylate, 2-ethylhexyl acrylate, and n-octyl acrylate, and an alkyl methacrylate monomer such as hexyl methacrylate, 2-ethylhexyl methacrylate, lauryl methacrylate, tridecyl methacrylate, and stearyl methacrylate. Among these, from the viewpoint of improving the impact resistance, it is preferable to contain at least one monomer selected from the group consisting of ethyl acrylate, n-butyl acrylate, 2-ethylhexyl acrylate, and n-octyl acrylate.

These can be used alone and two or more kinds thereof can be used in combination.

A proportion of the monomer (b-1) in the acrylic rubbery polymer (3-1) (100% by mass) is more preferably 60% by mass to 100% by mass, still more preferably 70% by mass to 100% by mass, particularly preferably 80% by mass to 98% by mass, and most preferably from 90% by mass to 95% by mass, from the viewpoint of impact resistance.

Examples of the monomer (b-2) include an aromatic vinyl monomer such as styrene and α-methylstyrene, a vinyl cyanide monomer such as nitrile acrylate and nitrile methacrylate, and various vinyl monomers such as (meth)acrylic group-modified silicone.

These can be used alone and two or more kinds thereof can be used in combination. A polymerization method of the monomer (b-2) is not particularly limited. The monomer (b-2) may be charged together with the monomer (b-1) at the same time and copolymerized, or may be charged separately from the monomer (b-1) and polymerized.

A proportion of the monomer (b-2) in the acrylic rubbery polymer (β-1) (100% by mass) is more preferably 0% by mass to 40% by mass, still more preferably 0% by mass to 30% by mass, particularly preferably 0% by mass to 20% by mass, and most preferably from 0.5% by mass to 5% by mass, from the viewpoint of impact resistance.

Examples of the monomer (b-3) include ethyleneglycol di(meth)acrylate, propyleneglycol di(meth)acrylate, 1,3-butyleneglycol di(meth)acrylate, 1,4-butyleneglycol di(meth)acrylate, divinylbenzene, polyfunctional (meth)acrylic group-modified silicone, allyl methacrylate, triallyl cyanurate, and triallyl isocyanurate.

These can be used alone and two or more kinds thereof can be used in combination.

A polymerization method of the monomer (b-3) is not particularly limited. In order to obtain an appropriate cross-linked structure, it is preferable that the monomer (b-3) is mixed with the monomer (b-1) and/or the monomer (b-2) and polymerized.

A proportion of the monomer (b-3) in the acrylic rubbery polymer (3-1) (100% by mass) is more preferably 0.1% by mass to 4% by mass, still more preferably 0.2% by mass to 3% by mass, and particularly preferably 0.5% by mass to 2% by mass, from the viewpoint of impact resistance.

Hereinafter, the rubber-containing graft polymer (A) in which a rubber part is the acrylic rubbery polymer (β-1) is referred to as an acrylic rubber-containing graft polymer.
(Diene-Based Rubbery Polymer)

The latex containing the diene-based rubbery polymer (diene-based rubber latex) can be produced, for example, by emulsion polymerization of 1,3-butadiene and one or more vinyl-based monomers that can be copolymerized with 1,3-butadiene.

The latex containing the butadiene-based rubbery polymer has a monomer composition of 50% to 100% by mass of 1,3-butadiene and 0% to 50% by mass of one or more vinyl monomers that can be copolymerized therewith, in 100% by mass of the total amount of monomers used for producing the diene-based rubbery polymer. Further, a proportion of the 1,3-butadiene is preferably 60% by mass or more, and more preferably 65% by mass or more.

When the proportion of the 1,3-butadiene in 100% by mass of the total amount of the monomers is equal to or more than the lower limit, it is easy to obtain sufficient impact resistance.

Examples of the vinyl-based monomer include aromatic vinyl such as styrene and α-methylstyrene, alkyl methacrylate such as methyl methacrylate and ethyl methacrylate, alkyl acrylate such as ethyl acrylate and n-butyl acrylate, unsaturated nitrile such as acrylonitrile and methacrylonitrile, vinyl ether such as methyl vinyl ether and butyl vinyl ether, vinyl halide such as vinyl chloride and vinyl bromide, vinylidene halide such as vinylidene chloride and vinylidene bromide, and vinyl-based monomers having a glycidyl group, such as glycidyl acrylate, glycidyl methacrylate, allyl glycidyl ether, and ethylene glycol glycidyl ether. Further, an aromatic polyfunctional vinyl compound such as divinylbenzene and divinyltoluene, polyhydric alcohol such as ethyleneglycol dimethacrylate and 1,3-butanediol diacrylate, allyl carboxylate such as trimethacrylate ester, triacrylate ester, allyl acrylate, and allyl methacrylate, and crosslinkable monomers such as diallyl and triallyl compounds such as diallyl phthalate, diallyl sebacate, and triallyl triazine can also be used in combination.

The vinyl-based monomer and the crosslinkable monomer may be used alone or two or more kinds thereof may be used in combination. In addition, as needed, a chain transfer agent such as t-dodecyl mercaptan, n-octyl mercaptan, and α-methyl styrene can be used at the time of polymerization of the butadiene-based rubber polymer.

As a method of polymerizing the latex containing the butadiene-based rubbery polymer, an emulsion polymerization method is used, and the polymerization can be appropriately performed at a temperature in a range of approximately 40° C. to 80° C., depending on a kind of the polymerization initiator. In addition, a known emulsifier can be appropriately used as the emulsifier. Before initiation of the polymerization, for example, seed latex made of styrene or the like may be charged in advance. As the polymerization method, multistage emulsion polymerization is preferable. That is, it is preferable that a part of the monomers to be used for polymerization is charged in advance in a reaction system, and after the initiation of the polymerization, it is preferable to use a system in which remaining monomers are added at once, dividedly, or continuously. When using such a polymerization system, favorable polymerization stability can be obtained, and latex having the desired particle size and particle size distribution can be stably obtained. In addition, when polymerizing the graft copolymer of a component (C) using the latex obtained by the polymerization method, a resin composition excellent in impact resistance and shaped appearance can be obtained. In a case of the multistage emulsion polymerization, a monomer composition to be charged earlier and a monomer composition to be charged later may be the same as or different from each other.

Hereinafter, the rubber-containing graft polymer (A) in which a rubber part is the diene rubbery polymer is referred to as a diene-based rubber-containing graft polymer.
(Polyorganosiloxane-Based Rubbery Polymer)

A polyorganosiloxane-based rubbery polymer (polyorganosiloxane-based rubber latex) is one or two kinds selected from a polyorganosiloxane rubber (S-1) and a polyorganosiloxane composite rubber (S-2).
(Polyorganosiloxane Rubber (S-1))

The polyorganosiloxane rubber (S-1) is obtained by emulsion polymerization of an organosiloxane mixture formed of an organosiloxane, a crosslinker for a polyorganosiloxane (hereinafter, referred to as "siloxane crosslinker"), and as needed, a crosslinking agent for a polyorganosiloxane (hereinafter, referred to as a "siloxane crosslinking agent"), a siloxane oligomer having a terminal blocking group, and the like.

As the organosiloxane, either a chain organosiloxane or a cyclic organosiloxane can be used, and the cyclic organosiloxane is preferable in that polymerization stability is high and a polymerization rate is high.

As the cyclic organosiloxane, a cyclic organosiloxane having 3 or more membered rings is preferable, and a cyclic organosiloxane having 3 to 6 membered ring is more preferable.

Examples of the cyclic organosiloxane include a hexamethylcyclotrisiloxane, an octamethylcyclotetrasiloxane, a decamethylcyclopentasiloxane, a dodecamethylcyclohexasiloxane, a trimethyltriphenylcyclotrisiloxane, a tetramethyltetraphenylcyclotetrasiloxane, and an octaphenylcyclotetrasiloxane. One kind of these may be used alone and two or more kinds thereof may be used in combination.

As the siloxane crosslinker, a crosslinker capable of bonding to the organosiloxane through a siloxane bond and forming a bond with a vinyl monomer such as a monomer forming poly(meth)acrylate or a vinyl monomer is preferable. Regarding reactivity with the organosiloxane, an alkoxysilane compound having a vinyl group is preferable.

When using the siloxane crosslinker, polyorganosiloxane having a functional group that can be polymerized with any vinyl copolymer can be obtained. When the polyorganosiloxane has the functional group that can be polymerized with any vinyl monomer, the polyorganosiloxane can be chemically bonded to the alkyl poly(meth)acrylate or a vinyl monomer.

Examples of the siloxane crosslinker can include a siloxane represented by Formula (1).

$$RSiR^1{}_n(OR^2)_{(3-n)} \tag{I}$$

In Formula (1), $R^1$ represents a methyl group, an ethyl group, a propyl group, or a phenyl group. $R^2$ represents an organic group in an alkoxy group, and examples thereof can include a methyl group, an ethyl group, a propyl group, or a phenyl group. n represents 0, 1, or 2. R represents any of the groups represented by Formulas (1-1) to (1-4).

$$CH_2=C(R^3)-COO-(CH_2)_p- \tag{I-1}$$

$$CH_2=C(R^4)-C_6H_4- \tag{I-2}$$

$$CH_2=CH- \tag{I-3}$$

$$HS-(CH_2)_p- \tag{I-4}$$

In these formulas, $R^3$ and $R^4$ each represent hydrogen or a methyl group, and p represents an integer of 1 to 6.

Examples of a functional group represented by Formula (1-1) include a methacryloyloxyalkyl group.

Examples of the siloxane having this group include 3-methacryloyloxyethyldimethoxymethylsilane, γ-methacryloyloxypropylmethoxydimethyl silane, γ-methacryloyloxypropyldimethoxymethylsilane, γ-methacryloyloxypropyltrimethoxysilane, γ-methacryloyloxypropylethoxydiethylsilane, γ-methacryloyloxypropyldiethoxymethylsilane, and 6-methacryloyloxybutyldiethoxymethylsilane.

Examples of a functional group represented by Formula (1-2) include a vinylphenyl group.

Examples of the siloxane having this group include a vinylphenylethyldimethoxysilane.

Examples of the siloxane having a functional group represented by Formula (I-3) include a vinyltrimethoxysilane and a vinyltriethoxysilane.

Examples of a functional group represented by Formula (1-4) include a mercaptoalkyl group.

Examples of the siloxane having this group can include γ-mercaptopropyldimethoxymethylsilane, γ-mercaptopropylmethoxydimethylsilane, γ-mercaptopropyldiethoxymethylsilane, γ-mercaptopropylethoxydimethylsilane, and γ-mercaptopropyltrimethoxysilane.

One kind of these siloxane crosslinkers may be used alone and two or more kinds thereof may be used in combination.

As the siloxane crosslinking agent, those having three or four functional groups capable of bonding to the organosiloxane are preferable. Examples of the siloxane crosslinking agent include trialkoxyalkylsilane such as trimethoxymethylsilane; trialkoxyarylsilane such as triethoxyphenylsilane; and tetraalkoxysilane such as tetramethoxysilane, tetraethoxysilane, tetra-n-propoxysilane, and tetrabutoxysilane. One kind of these may be used alone and two or more kinds thereof may be used in combination. Among these, the tetraalkoxysilane is preferable, and tetraethoxysilane is more preferable.

The siloxane oligomer having a terminal blocking group refers to a siloxane oligomer having an alkyl group or the like at an end of the organosiloxane oligomer and terminating the polymerization of the polyorganosiloxane.

Examples of the siloxane oligomer having a terminal blocking group can include hexamethyldisiloxane, 1,3-bis (3-glycidoxypropyl)tetramethyldisiloxane, 1,3-bis(3-aminopropyl)tetramethyldisiloxane, and methoxytrimethylsilane.

A content rate of the organosiloxane in the organosiloxane mixture (100% by mass) is preferably in a range of 60% to 99.9% by mass, and more preferably in a range of 70% to 99.9% by mass.

A content rate of the siloxane crosslinker in the organosiloxane mixture (100% by mass) is preferably in a range of 0.1% to 10% by mass.

A content rate of the siloxane crosslinking agent in the organosiloxane mixture (100% by mass) is preferably in a range of 0% to 30% by mass.

(Polyorganosiloxane Composite Rubber (S-2))

In the present invention, the polyorganosiloxane-based composite rubber (C1-3S-2) contains the polyorganosiloxane rubber (S-1) and a vinyl polymer for composite rubber. The polyorganosiloxane composite rubber (S-2) preferably contains the polyorganosiloxane rubber (S-1) and a polyalkyl (meth)acrylate rubber.

The vinyl polymer for composite rubber is obtained by polymerizing the vinyl monomer for composite rubber and, as needed, a crosslinkable monomer or an acrylic crosslinker.

Examples of the vinyl monomer for composite rubber include alkyl acrylates such as methyl acrylate, ethyl acrylate, n-propyl acrylate, and n-butyl acrylate; alkyl methacrylates such as methyl methacrylate, ethyl methacrylate, n-propyl methacrylate, n-butyl methacrylate, and i-butyl methacrylate; aromatic vinyl monomers such as styrene and α-methylstyrene; and vinyl cyanide monomers such as acrylonitrile and methacrylonitrile.

As the vinyl monomer for composite rubber, the n-butyl acrylate is preferable in that a shaped article is excellent in impact resistance.

The crosslinkable monomer is a polyfunctional monomer having two or more polymerizable unsaturated bonds. Examples thereof include allyl methacrylate, triallyl cyanurate, triallyl isocyanurate, divinylbenzene, ethyleneglycol dimethacrylate, propyleneglycol dimethacrylate, 1,3-butyleneglycol dimethacrylate, 1,4-butyleneglycol dimethacrylate, 1,6-hexanediol diacrylate, and triallyl trimellitate. These can be used alone, and two or more thereof can be used in combination.

The acrylic crosslinker is a polyfunctional monomer having two or more polymerizable unsaturated bonds having different reactivities.

When having groups having different reactivities, the unsaturated groups are incorporated into the composite rubber in a state where the unsaturated groups are retained, when polymerized together with other components, and it is possible to form a graft copolymer. Examples thereof include allyl methacrylate, triallyl cyanurate, and triallyl isocyanurate. These can be used alone or two or more kinds thereof can be used in combination.

The acrylic crosslinker has two or more polymerizable unsaturated bonds as the crosslinkable monomer, and thus, also has a function as a crosslinking agent.

The crosslinkable monomer is preferably used in the amount of 0 to 15 parts, more preferably in the amount of 0.1 to 10 parts, with respect to 100 parts by mass of the vinyl monomer for composite rubber.

When the amount of the crosslinkable monomer used is equal to or less than the upper limit, that is, 15 parts or less, the shaped article tends to be excellent in impact resistance.

The acrylic crosslinker is preferably used in the amount of 0 to 15 parts, more preferably in the amount of 0.1 to 10 parts, with respect to 100 parts by mass of the vinyl monomer for composite rubber.

When the amount of the acrylic crosslinker used is equal to or less than the upper limit, that is, 15 parts or less, the shaped article tends to be excellent in impact resistance.

In 100% by mass of the polyorganosiloxane composite rubber (S-2), a content rate of the polyorganosiloxane rubber (S-1) is preferably 0.1% by mass to 99.9% by mass, more preferably 5% by mass to 90% by mass, and particularly preferably 7% by mass to 85% by mass.

When the content rate of the polyorganosiloxane rubber (S-1) is equal to or more than the lower limit, the shaped article tends to be excellent in impact resistance. When the content rate of the polyorganosiloxane rubber (S-1) is equal to or less than the upper limit, the shaped article tends to be excellent in heat resistance.

Hereinafter, the rubber-containing graft polymer (A) in which a rubber part is a polyorganosiloxane-based rubbery polymer is referred to as a Si-based rubber-containing graft polymer.

The rubber-containing graft polymer (A) obtained by the above production method is excellent in dispersibility of the "rubbery polymer" in the thermoplastic resin, and improves the mechanical strength represented by impact strength. In addition, weld strength improves and favorable mechanical strength is exhibited irrespective of a condition under which the thermoplastic resin is melt molded by injection molding or the like (dependence of mechanical strength on molding processing is low).

(Emulsifier)

An emulsifier used in the production of the rubber-containing graft polymer (A) is not particularly limited. For example, anionic surfactants such as fatty acid salt, alkyl sulfate salt, alkyl benzene sulfonate salt, alkyl phosphate ester salt, and dialkyl sulfosuccinate salts; nonionic surfactants such as polyoxyethylene alkyl ether, polyoxyethylene fatty acid ester, sorbitan fatty acid ester, and glycerin fatty acid ester; and cationic surfactants such as alkylamine salt can be used. In addition, these emulsifiers can be used alone or in combination.

In addition, the polymerization method for obtaining the rubber-containing graft polymer (A) can be performed by emulsion polymerization and, if necessary, by forced emulsion polymerization. For example, in a case where a poorly water-soluble monomer such as 2-ethylhexyl acrylate, lauryl methacrylate, and stearyl methacrylate was selected as a monomer forming the acrylic component when polymerization of the acrylic rubbery polymer ($\beta$-1), it is preferable to select a forced emulsion polymerization method in order to suppress the generation of cullet and stabilize the polymerization.

The rubber-containing graft polymer (A) of the present invention in a latex state obtained by the graft polymerization can be obtained as a powder by coagulating and washing and then drying, or by spray recovery.

(Thermoplastic Resin (B))

A resin composition containing a rubber-containing graft polymer of the present invention includes the rubber-containing graft polymer (A) of the present invention and the thermoplastic resin (B).

In many thermoplastic resins, including polyester, aromatic polycarbonate, styrene-based resin, vinyl chloride resin, and olefin resin such as polyethylene, a resin modifier including methyl methacrylate as a main component is often used. Therefore, the rubber-containing graft polymer (A) of the present invention including a graft chain having methyl methacrylate as a main component can be suitably used. Therefore, the thermoplastic resin is not particularly limited, and can be applied to a wide variety of resins such as engineering plastic, styrene-based resin, polyester, olefin resin, thermoplastic elastomer, a biodegradable polymer, a halogen polymer, and acrylic resin.

The engineering plastic is not particularly limited as long as it is various known thermoplastic engineering plastics. Examples thereof can include polyester-based polymers such as polyphenylene ether, polycarbonate, polyethylene terephthalate, and polybutylene terephthalate, nylon polymers such as syndiotactic polystyrene, 6-nylon, and 6,6-nylon, polyarylate, polyphenylene sulfide, polyetherketone, polyetheretherketone, polysulfone, polyether sulfone, polyamide imide, polyetherimide, and polyacetal.

In addition, examples of the engineering plastics in the present invention can include special styrene-based resin, such as heat-resistant ABS, or heat-resistant acrylic resin, which are highly heat-resistant and requires melt fluidity.

Among these, the aromatic polycarbonate, the polyesters, and the styrene-based resin, required to have strength developability, are more preferable.

The aromatic polycarbonate is not particularly limited as long as it is a polymer compound having a carbonate bond (—O—C(O)—O—) in a main chain. Examples thereof include 4,4'-dioxydiarylalkane-based polycarbonate such as 2,2-bis(4-hydroxyphenyl)propane-based polycarbonate (bisphenol A-based polycarbonate).

Examples of the olefin-based resin include high-density polyethylene, medium-density polyethylene, low-density polyethylene, or copolymers of ethylene and other $\alpha$-olefins; polypropylene or copolymers of propylene and other $\alpha$-olefins; and polybutenes and poly-4-methylpentene-1.

Examples of the thermoplastic elastomer include styrene-based elastomers such as a styrene-butadiene-styrene copolymer (SBS), a styrene-isoprene-styrene copolymer (SIS), a styrene-ethylene/butene copolymer (SEB), a styrene-ethylene/propylene copolymer (SEP), a styrene-ethylene/butene-styrene copolymer (SEBS), a styrene-ethylene-propylene/styrene copolymer (SEPS), a styrene-ethylene/ethylene/propylene-styrene copolymer (SEEPS), a styrene-butadiene/butylene-styrene copolymer (partially hydrogenated styrene-butadiene-styrene copolymer: SBBS), a partially hydrogenated styrene-isoprene-styrene copolymer, and a partially hydrogenated styrene-isoprene/butadiene-styrene copolymer, urethane-based elastomers produced by reacting a polymer diol (such as polyester diol, polyether diol, polyester ether diol, polycarbonate diol, and polyester polycarbonate diol), an organic diisocyanate (examples of the organic diisocyanates include 4,4'-diphenylmethane diisocyanate, toluene diisocyanate, p-phenylene diisocyanate, xylylene diisocyanate, naphthalene diisocyanate, hydrogenated 4,4'-diphenylmethane diisocyanate (4,4'-dicyclohexyl methane diisocyanate), isophorone diisocyanate, and hexamethylene diisocyanate, and among these organic diisocyanates, the 4,4'-diphenylmethane diisocyanate) and a chain extender (such as ethylene glycol, diethylene glycol, 1,4-butanediol, 1,5-pentanediol, 2-methyl-1,3-propanediol, 1,6-hexanediol, neopentyl glycol, 1,9-nonanediol, cyclohexanediol, and 1,4-bis($\beta$-hydroxyethoxy)benzene), polyolefin-based elastomers such as ethylene-propylene rubber, ethylene-propylene-diene rubber, an ethylene-vinyl acetate copolymer, butyl rubber, butadiene rubber, a propylene-butene copolymer, and an ethylene-acrylate copolymer, polyamide-based elastomer, fluorine-based elastomer, chlorinated PE elastomer, and acrylic elastomer.

Examples of the styrene-based resin include polystyrene, an acrylonitrile-styrene copolymer, an acrylonitrile-styrene-$\alpha$-methylstyrene copolymer, an acrylonitrile-methyl methacrylate-styrene-$\alpha$-methyl styrene copolymer, ABS resin, AS resin, MABS resin, MBS resin, AAS resin, AES resin, an acrylonitrile-butadiene-styrene-$\alpha$-methylstyrene copolymer, an acrylonitrile-methyl methacrylate-butadiene-styrene-$\alpha$-methylstyrene copolymer, a styrene-maleic anhydride copolymer, a styrene-maleimide copolymer, a styrene-N-substituted maleimide copolymer, an acrylonitrile-styrene-N-substituted maleimide copolymer, an acrylonitrile-butadiene-styrene-$\beta$-isopropenylnaphthalene copolymer, and an acrylonitrile-methyl methacrylate-butadiene-styrene-$\alpha$-methylstyrene-maleimide copolymer.

One kind of these may be contained alone and two or more kinds thereof may be contained.

The polyester is a polymer formed of a polybasic acid and a polyhydric alcohol, and is not particularly limited as long as it has thermoplasticity.

Examples of the polybasic acid include terephthalic acid, naphthaldicarboxylic acid, cyclohexyldicarboxylic acid, or esters thereof. Examples of the polyhydric alcohols include ethylene glycol, propylene glycol, butanediol, pentanediol, neopentyl glycol, hexanediol, octanediol, decanediol, cyclohexanedimethanol, hydroquinone, bisphenol A, 2,2-bis(4-hydroxyethoxyphenyl) propane, 1,4-dimethyloltetrabromobenzene, and TBA-EO.

The polyester resin may be a homopolymer, a copolymer, or a blend of two or more thereof. In addition, "PETG" (trade name, manufactured by Eastman Chemical Company) is also suitably used.

Examples of the biodegradable polymer include a microbial polymer such as biopolyester (such as PHB/V), bacterial cellulose, and microbial polysaccharide (such as pullulan and curdlan), a chemically synthesized polymer such as aliphatic polyester (such as polycaprolactone, polybutylene succinate, polyethylene succinate, polyglycolic acid, and polylactic acid), polyvinyl alcohol, and polyamino acids (such as PMLG), or a natural product polymer such as chitosan/cellulose, starch, cellulose acetate.

Examples of the halogenated polymer include a homopolymer of vinyl chloride, a copolymer containing vinyl chloride in a proportion of 80% by mass or more, and a highly chlorinated polyvinyl chloride.

Examples of components of the copolymer include a monoviny compound such as ethylene, vinyl acetate, methyl methacrylate, and butyl acrylate, in addition to the vinyl chloride.

In 100% by mass of the copolymer, these monovinyl compounds may be contained in a total amount of 20% by mass or less, in terms of proportion.

The homopolymer and the copolymer may be contained respectively alone, and two or more kinds thereof may be contained.

In addition, examples thereof also include a fluorinated polymer, a brominated polymer, and an iodinated polymer.

Examples of the acrylic resin include a copolymer obtained by polymerizing a vinyl monomer copolymerizable with the methyl methacrylate.

Examples of the vinyl monomer copolymerizable with the methyl methacrylate include alkyl acrylate such as methyl acrylate, ethyl acrylate, i-propyl acrylate, n-butyl acrylate, and 2-ethylhexyl acrylate, alkyl methacrylate such as ethyl methacrylate, propyl methacrylate, and n-butyl methacrylate, and an aromatic vinyl compound such as styrene, α-methylstyrene, and vinyltoluene.

A polymer alloy of the above described thermoplastic resin and polyphenylene ether, polycarbonate, polyester-based resin such as polyethylene terephthalate and polybutylene terephthalate, syndiotactic polystyrene, an polyamide resin such as 6-nylon, and 6,6-nylon, or an engineering plastics such as polyarylate, polyphenylene sulfide, polyetherketone, polyetheretherketone, polysulfone, polyether sulfone, polyamide imide, polyetherimide, and polyacetal is also included in the scope of the present invention.

The resin composition of the present invention can include, in addition to the above materials, various known additives, for example, a stabilizer, a flame retardant, a flame retardant aid, a hydrolysis inhibitor, an antistatic agent, a foaming agent, a dye, and a pigment, within a range not impairing the object of the present invention.

A method of blending each material when preparing the resin composition of the present invention includes a known blending method, and is not particularly limited. Examples thereof include a method of mixing and kneading with a tumbler, a V-type blender, a super mixer, a Nauta mixer, a Banbury mixer, a kneading roll, an extruder, or the like.

EXAMPLES

Hereinafter, the present invention will be further specifically described, using Production Examples and Examples. Production Examples 1 to 13 are production examples of the rubbery polymer and the rubber-containing graft polymer (A). "Part(s)" means "part(s) by mass", and "%" means "% by mass".

Production Example 1

"Component 1" formed of water and an emulsifier shown in Table 1 was added into a separable flask equipped with a cooling pipe, a thermometer, and a stirrer. The atmosphere in the flask was purged with nitrogen by passing a nitrogen stream through the separable flask and a liquid temperature was raised to 80° C. At the time when the liquid temperature reached 80° C., a seed monomer "Component 2" shown in Table 1 was mixed, and after stirring the mixture for 5 minutes, a polymerization initiator "Component 3" shown in Table 1 was added thereto, and the polymerization was started (the temperature may increase by about 10° C. as a maximum value due to heat generated by polymerization). Thereafter, the liquid temperature was maintained for 25 minutes while keeping the temperature not lower than 78° C.

Further, a rubber-forming monomer "Component 4" shown in Table 1 was forcibly emulsified and added dropwise into the separable flask over 180 minutes while controlling the liquid temperature at 80±2° C. Thereafter, the mixture was maintained for 60 minutes while keeping the liquid temperature at 80° C.±2° C. In this manner, rubbery polymer latex was obtained. A particle size of the rubbery polymer latex at this time was 230 nm as measured by a light scattering method. A rate of polymerization was 99%. Subsequently, a graft component monomer "Component 5" shown in Table 1 was added dropwise over 30 minutes while controlling a liquid temperature thereof at 80° C.±2° C. Thereafter, the mixture was maintained for 60 minutes while keeping the liquid temperature at 80° C.±2° C. In this manner, acrylic rubber-based graft latex was obtained. A rate of polymerization was 99.5%. In addition, for sodium dodecylbenzenesulfonate, "NEOPELEX G-15 (trade name, 16% aqueous solution of sodium dodecylbenzenesulfonate), manufactured by KAO Corporation" was used. For sodium dialkyl sulfosuccinate, "PELEX OT-P (trade name, 80% methanol solution of sodium dialkyl sulfosuccinate), manufactured by KAO Corporation" was used. In addition, for unsaturated fatty acid hydroxyalkyl ester-modified ε-caprolactone, "Placcel FM1" (trade name, manufactured by Daicel Corporation) represented by Formula (3) was used.

$$CH_2=CCH_3COO(CH_2)_2OCO(CH_2)_5OH \quad (3)$$

TABLE 1

| | | Production Example 1 A-1 | Production Example 2 A-2 | Production Example 3 A-3 | Production Example 4 B-1 | Production Example 5 B-2 | Production Example 6 B-3 | Production Example 7 B-4 | Production Example 8 B-5 |
|---|---|---|---|---|---|---|---|---|---|
| Component 1 | Deionized water | 160.00 | 160.00 | 160.00 | 160.00 | 160.00 | 160.00 | 160.00 | 160.00 |
| | Tridecyloxyhexaoxyethylene sodium phosphate | 0.02 | 0.02 | — | 0.02 | 0.02 | 0.02 | 0.02 | — |
| | Sodium dialkyl sulfosuccinate | — | — | 0.08 | — | — | — | — | 0.08 |

TABLE 1-continued

| | | Production Example 1 A-1 | Production Example 2 A-2 | Production Example 3 A-3 | Production Example 4 B-1 | Production Example 5 B-2 | Production Example 6 B-3 | Production Example 7 B-4 | Production Example 8 B-5 |
|---|---|---|---|---|---|---|---|---|---|
| Component 2 | Methyl methacrylate | 3.15 | 3.15 | 3.15 | 3.15 | 3.15 | 3.15 | 3.15 | 3.15 |
| | n-Butyl acrylate | 1.62 | 1.62 | 1.62 | 1.62 | 1.62 | 1.62 | 1.62 | 1.62 |
| | Allyl methacrylate | 0.02 | 0.02 | 0.02 | 0.02 | 0.02 | 0.02 | 0.02 | 0.02 |
| Component 3 | Potassium peroxodisulfate | 0.05 | 0.05 | 0.05 | 0.05 | 0.05 | 0.05 | 0.05 | 0.05 |
| | Deionized water | 3.00 | 3.00 | 3.00 | 3.00 | 3.00 | 3.00 | 3.00 | 3.00 |
| Component 4 | n-Butyl acrylate | 73.12 | 73.12 | 73.12 | 73.12 | 73.12 | 73.12 | 73.12 | 73.12 |
| | Styrene | 1.00 | 1.00 | 1.00 | 1.00 | 1.00 | 1.00 | 1.00 | 1.00 |
| | Allyl methacrylate | 0.38 | 0.38 | 0.38 | 0.38 | 0.38 | 0.38 | 0.38 | 0.38 |
| | Tridecyloxyhexaoxyethylene sodium phosphate | 0.50 | 0.50 | — | 0.50 | 0.50 | 0.50 | 0.50 | — |
| | Sodium dodecylbenzenesulfonate | — | — | 0.38 | — | — | — | — | 0.38 |
| | Deionized water | 24.00 | 24.00 | 24.00 | 24.00 | 24.00 | 24.00 | 24.00 | 24.00 |
| Component 5 | Unsaturated fatty acid hydroxyalkyl ester-modified ε-caprolactone | 1.01 | 5.57 | 2.00 | — | — | — | — | — |
| | Glycidyl methacrylate | — | — | — | — | 0.59 | 3.29 | — | — |
| | 2-Hydroxyethyl methacrylate | — | — | — | — | — | — | 0.54 | — |
| | Phenyl methacrylate | — | — | — | — | — | — | — | — |
| | Methyl methacrylate | 18.79 | 14.23 | 18.00 | 20.00 | 19.21 | 16.51 | 19.26 | 20.00 |
| | n-Butyl acrylate | 0.20 | 0.20 | — | — | 0.20 | 0.20 | 0.20 | — |
| | t-Butyl hydroperoxide | — | — | — | — | — | — | — | — |
| | Tridecyloxyhexaoxyethylene sodium phosphate | — | 0.13 | — | — | — | — | — | — |
| | Sodium dodecylbenzenesulfonate | — | — | 1.25 | — | — | — | — | — |
| | Deionized water | — | 6.50 | 10.00 | — | — | — | — | — |
| Amount of functional groups in rubber-containing graft polymer (Calculated value) [mmol/100 g] | | 4 | 23 | 8 | — | 4 | 23 | 4 | — |
| Particle size of rubber polymer latex [nm] | | 230 | 230 | 270 | 230 | 230 | 230 | 230 | 200 |

An aqueous solution in which "Component 6" shown in Table 2 was blended was set to have a liquid temperature of 40° C.±5° C., and the acrylic rubber-based graft latex was charged into the aqueous solution to form slurry. The slurry was agglomerated by raising the liquid temperature to 70° C.±5° C. and maintaining for 5 minutes. The agglomerate was collected, immersed in 1500 parts of deionized water, and dehydrated twice, and dried at 65° C.±5 for 12 hours to obtain a powder of a rubber-containing graft polymer (A-1).

TABLE 2

| | Material | Parts |
|---|---|---|
| Component 6 | Deionized water | 500 |
| | Calcium acetate | 5 |

Production Examples 2 to 8

Except that each component shown in Table 1 was changed, powders of rubber-containing graft polymers (A-2), (A-3), and (B-1) to (B-5) were obtained in the same manner as in Production Example 1. Here, in A-2 and A-3, "Component 5" were forcibly emulsified and then added dropwise. A rate of polymerization of each of the rubber latex and the graft latex was 95% or more.

Production Example 9

(1) Production of Diene-Based Rubbery Polymer Latex (R-1)

"Component 7" shown in Table 3 as a first monomer mixed liquid was charged into an autoclave with 70 L capacity, and the temperature was raised. At the time when the liquid temperature reached 43° C., a redox-based initiator of "Component 8" shown in Table 3 was added to start a reaction, and then the liquid temperature was further raised to 65° C. Three hours after the start of polymerization, a polymerization initiator of "Component 9" shown in Table 3 was added, and after 1 hour, a second monomer mixed liquid of "Component 10" shown in Table 3 and an emulsifier aqueous solution of "Component 11" shown in Table 3, and a polymerization initiator of "Component 12" shown in Table 3 were continuously added dropwise into the autoclave over 8 hours. The reaction was performed for 4 hours from the start of the polymerization to obtain rubbery polymer latex (R-1).

TABLE 3

| | Material | Part(s) |
|---|---|---|
| Component 7 | 1,3-butadiene | 19 |
| | Styrene | 1 |
| | t-Dodecyl mercaptan | 0.1 |
| | Isopropylbenzene hydroperoxide | 0.3 |
| | Sodium formaldehyde sulfoxylate | 0.2 |
| | Sodium alkyl diphenyl ether disulfonate (SS-L) | 0.1 |
| | Sodium hydroxide | 0.01 |
| | Deionized water | 146 |
| Component 8 | Ferrous sulfate | 0.0005 |
| | Ethylenediamine tetraacetic acid-disodium salt | 0.0015 |
| | Deionized water | 4 |
| Component 9 | Isopropylbenzene hydroperoxide | 0.1 |
| Component 10 | 1,3-butadiene | 76 |
| | Styrene | 4 |
| | t-Dodecyl mercaptan | 0.4 |
| Component 11 | Sodium alkyl diphenyl ether disulfonate (SS-L) | 1.3 |
| | Sodium formaldehyde sulfoxylate | 0.4 |
| | Deionized water | 29 |
| Component 12 | Isopropylbenzene hydroperoxide | 0.6 |

(2) Production of Graft Polymer (A-4) of Rubber-Containing Graft Polymer 222 parts of latex (R-1) (80 parts as a charged monomer component) and 143 parts of deionized water were charged into a reaction vessel equipped with a stirrer and a reflux condenser tube. The atmosphere in the flask was purged with nitrogen by passing a nitrogen stream through the separable flask and a liquid temperature was raised to 70° C. Next, an aqueous solution including "Component 13" shown in Table 4 was added, followed by continuous heating and stirring for 30 minutes. Further, the mixture of "Component 14" shown in Table 4 was forcibly emulsified, and added dropwise into the reaction vessel over 60 minutes, followed by continuous heating and stirring for 120 minutes. In this manner, a vinyl monomer was graft-polymerized to the rubbery polymer to obtain rubber-containing graft polymer latex. A rate of polymerization was 100%. For sodium dodecylbenzenesulfonate, "NEOPELEX G-15 (trade name, manufactured by KAO Corporation, 16% aqueous solution of sodium dodecylbenzenesulfonate)" was used.

In addition, for unsaturated fatty acid hydroxyalkyl ester-modified ε-caprolactone, "Placcel FM1" (trade name, manufactured by Daicel Corporation) represented by Formula (3) was used.

100%. A volume average particle size of the polymer particles in this latex was 170 nm, and a value obtained by dividing a volume average particle size (Dv) by the number average particle size (Dn) was (Dv/Dn)=1.05.

Production Example 12

1) Production of Polyorganosiloxane Rubber Latex (S-1)

97.5 parts of a cyclic organosiloxane mixture (manufactured by Shin-Etsu Silicones, product name: DMC), 2 parts of tetraethoxysilane (TEOS), and 0.5 part of γ-methacryloyloxypropyldimethoxymethylsilane (DSMA) were mixed to obtain 100 parts of an organosiloxane mixture. An aqueous solution obtained by dissolving 0.68 parts of sodium dodecylbenzenesulfonate (DBSNa) and 0.68 parts of dodecylbenzenesulfonic acid (DBSH) in 200 parts of deionized water is added to the mixture, and stirred with a homomixer at 10,000 rpm for 2 minutes. Thereafter, the mixture was passed twice through a homogenizer at a pressure of 20 MPa to obtain a stable premixed emulsion.

Next, the emulsion was charged into a separable flask with 5-liter capacity, equipped with a cooling condenser. The emulsion was heated to 85° C. and maintained for 6 hours to be subjected to a polymerization reaction, and then,

TABLE 4

| | Material | Production Example 9 A-4 Part(s) | Production Example 10 B-6 Part(s) | Production Example 11 B-7 Part(s) |
|---|---|---|---|---|
| — | Diene-based rubbery polymer latex (R-1) | 222 | 222 | 222 |
| | Deionized water | 143 | 153 | 153 |
| Component 13 | Sodium formaldehyde sulfoxylate | 0.06 | 0.06 | 0.06 |
| | Ferrous sulfate | 0.0005 | — | 0.0005 |
| | Ethylenediamine tetraacetic acid-disodium salt | 0.0015 | — | 0.0015 |
| | Deionized water | 5 | 5 | 5 |
| Component 14 | Unsaturated fatty acid hydroxyalkyl ester-modified ε-caprolactone | 1 | — | — |
| | Methyl methacrylate | 19 | 20 | — |
| | Styrene | — | — | 15 |
| | Acrylonitrile | — | — | 5 |
| | t-Butyl hydroperoxide | 0.08 | 0.08 | 0.08 |
| | Sodium dodecylbenzenesulfonate | 1.25 | — | — |
| | Deionized water | 10 | — | — |
| Amount of functional groups in rubber-containing graft polymer (Calculated value) [mmol/100 g] | | 4 | — | — |

2.2 parts by mass of an emulsion of a stabilizer were blended with 241.3 parts by mass of the obtained rubber-containing graft polymer latex and mixed. An aqueous solution in which "Component 6" shown in Table 2 was blended was set to 40° C., and the rubber-based graft latex in which the emulsion of the stabilizer was blended was added to the aqueous solution to form slurry. The slurry was agglomerated by raising the liquid temperature to 70° C. and maintaining for 5 minutes. The agglomerate was collected, immersed in 1500 parts of deionized water, and dehydrated twice, and dried at 60° C. for 12 hours to obtain a powder of a rubber-containing graft polymer (A-4).

Production Examples 10 and 11

Except that each component shown in Table 4 was changed and "Component 14" shown in Table 4 was not forcibly emulsified, powders of rubber-containing graft polymers (B-6) and (B-7) were obtained in the same manner as in Production Example 7. A rate of polymerization was was cooled to 25° C. and maintained at 25° C. for 12 hours. Thereafter, the reaction solution was neutralized to pH 7.0 by adding a 5% sodium hydroxide aqueous solution to obtain polyorganosiloxane rubber latex (S-1).

A solid content of this latex was 40%. In addition, the latex had a number average particle size (Dn) of 170 nm, a volume average particle size (Dv) of 210 nm, and Dv/Dn of 1.24.

(2) Production of Polyorganosiloxane Composite Rubber (S-2) and Rubber-Containing Graft Polymer (A-5)

14.5 parts of the polyorganosiloxane rubber latex (S-1) (5 parts as a charged monomer component) was collected in a separable flask with 5-liters capacity. Next, 133 parts of deionized water and 3.3 parts of sodium dodecylbenzenesulfonate (trade name "NEOPELEX G-15, manufactured by KAO Corporation") were added into the separable flask and mixed. Next, a mixture of 55.4 parts of n-butyl acrylate (n-BA), 0.6 parts of allyl methacrylate (AMA), and 0.2 parts of tert-butyl hydroperoxide (t-BH) was added to the separable flask.

The atmosphere in the flask was purged with nitrogen by passing a nitrogen stream through the separable flask and a liquid temperature was raised to 45° C. At the time when reached 45° C., an aqueous solution in which 0.001 parts of ferrous sulfate (Fe), 0.003 parts of disodium ethylenediaminetetraacetic acid (EDTA), and 0.2 parts of sodium formaldehyde sulfoxylate (SFS) were dissolved in 4.7 parts of deionized water was added thereto, and radical polymerization was started. In order to complete the polymerization of the acrylate component, a state in which the liquid temperature was 65° C. was maintained for 1 hour to obtain a composite rubber latex (S-3) of polyorganosiloxane and n-BA.

In a state in which the temperature of the composite rubber latex (S-3) was maintained at 65° C., a mixed liquid of 27.7 parts of n-BA, 0.3 parts of AMA, and 0.1 parts of t-BH was added dropwise to the latex over 45 minutes, and then heated and stirred for 1 hour. Next, a mixed liquid of 10 parts of methyl methacrylate (MMA), 1 part of unsaturated fatty acid hydroxyalkyl ester-modified ε-caprolactone, and 0.3 parts of sodium dodecylbenzenesulfonate (trade name "NEOPELEX G-15, manufactured by KAO Corporation"), 3 parts of deionized water, and 0.06 parts of t-BH were forcibly emulsified and added dropwise into the latex over 20 minutes and polymerized. After completion of the dropwise addition, the liquid temperature was maintained at 65° C. for 1 hour, and then cooled to 25° C. to obtain rubber-containing graft polymer (A-5) latex. Here, for the unsaturated fatty acid hydroxyalkyl ester-modified ε-caprolactone, "Placcel FM1" (trade name, manufactured by Daicel Corporation) represented by Formula (3) was used.

The obtained rubber-containing graft polymer (A-5) latex was added to 300 parts by mass of deionized water containing 5 parts by mass of calcium acetate to coagulate the polymer, washed with water, dehydrated, and dried to obtain a powder of a rubbery graft polymer (A-5).

Production Example 13

In a state in which the temperature of the composite rubber latex (S-3) of polyorganosiloxane and n-BA produced in the same manner as in Production Example 12 was maintained at 65° C., a mixed liquid of 27.7 parts of n-BA, 0.3 parts of AMA, and 0.1 parts of t-BH was added dropwise to the latex over 45 minutes, and then heated and stirred for 1 hour. Next, a mixed liquid of 10.5 parts of methyl methacrylate (MMA), 0.5 parts of n-BA, and 0.06 parts of t-BH was added dropwise into the latex over 20 minutes and polymerized. After completion of the dropwise addition, the liquid temperature was maintained at 65° C. for 1 hour, and then cooled to 25° C. to obtain rubber-containing graft polymer (B-8) latex.

The obtained rubber-containing graft polymer (B-8) latex was added to 300 parts by mass of deionized water containing 5 parts by mass of calcium acetate to coagulate the polymer, washed with water, dehydrated, and dried to obtain a powder of a rubbery graft polymer (B-8).

[Measurement 1; Separation and Measurement Method of Tetrahydrofuran Insoluble Component in Rubber-Containing Graft Polymer]
[1] Preparation of Dry Sample The following operations (1) to (9) are performed to separate the organic solvent soluble component and the organic solvent insoluble component from each other. Here, as the organic solvent, in a case of diene rubber-containing graft polymers (A-4, B-6, and B-7), tetrahydrofuran is used, and in a case of an acrylic rubber-containing polymer and a Si-based rubber-containing polymers (A-1 to A-3, B-1 to B-5, A-5, and B-8), acetone was used.

(1) A solution including 1% by mass of a rubber-containing graft polymer and 99% by mass of an organic solvent is prepared.

(2) The solution prepared in (1) is stirred for 1 hour.

(3) The solution stirred in (2) is centrifuged at 14,000 rpm for 60 minutes.

(4) A supernatant is extracted and placed in a flask.

(5) The same amount of the organic solvent as in (1) is added again to a precipitate (the organic solvent insoluble component).

(6) Operations (3) to (5) were repeated three times.

(7) The flask is set in a constant temperature bath at a temperature of 70° C., and volatile components are distilled off using an evaporator.

(8) A residue in the flask is dried with a steam dryer at 80° C. for 8 hours, and further dried with a vacuum dryer at 65° C. for 6 hours to obtain a dry sample of the organic solvent soluble component.

(9) A container containing the precipitate is set in a constant temperature bath at a temperature of 60° C., and the organic solvent is volatilized. Then, the precipitate was dried with a vacuum drier at 65° C. for 6 hours to obtain a dry sample of the organic solvent insoluble component.

[2] Calculation of Organic Solvent Insoluble Component

The organic solvent insoluble content rate is calculated from the mass of the dry sample of the organic solvent insoluble component obtained in the operation (9). A value obtained by subtracting the mass of the organic solvent insoluble component from the charged mass of the rubber-containing graft polymer represents the organic solvent soluble component.

[Measurement 2: Quantification of Caprolactone Unit (CL) in Graft Chain]

The graft chain was extracted from the rubber-containing graft polymer (A), and the composition was analyzed. The extraction of the graft chain is performed by an ozone addition reaction in the case of the diene rubber-containing graft polymer (A-4, B-6, and B-7), and by cryogrinding in the case of the acrylic rubber-containing polymer and the Si-based rubber-containing polymer (A-1 to A-3, B-1 to B-5, A-5, and B-8).

[1] Extraction of Graft Chain
(Cryogrinding: A-1, A-2, B-1 to B-5, A-5, and B-8)

Using a 6751 vial (polycarbonate tube, steel end plug and styrol impactor) as a grinding container, 0.9 g of an acetone insoluble component of the rubber-containing graft polymer is cryoground (manufactured by SPEX CertiPrep Ltd, product name: SPEX6750 FREEZER/MILL: Condition Precooling 15 minutes, grinding for 2 minutes (20 times/sec), cooling time 2 minutes, 4 cycles). 100 mg of cryoground acetone insoluble component is weighed, transferred to a 50 mL vial, and further stirred by adding 30 mL of acetone thereto, and then allowed to stand for 10 hours. The soluble component and the insoluble component are separated from each other by performing centrifugation using a centrifuge (Hitachi high-speed cooling centrifuge (CR22N), manufactured by Hitachi Koki Co., Ltd.) at a temperature of 4° C. for 60 minutes at a rotation speed of 12,000 rpm. 30 mL of acetone is again added and dispersed to the obtained insoluble component, and centrifugation is performed by a centrifuge to separate the mixture into a soluble component and an insoluble component. The soluble component is dried in an inert oven under nitrogen at 40° C. for 10 hours or longer to obtain a "graft chain dry sample".

(Ozone Addition Reaction: A-4, B-6, and B-7)

An ozone addition reaction was performed according to the following operations (1) to (9).

(1) 6% by mass of tetrahydrofuran (THF) insoluble component of the diene-based rubber-containing graft polymer and 94% by mass of 1:1 mixed liquid of chloroform and methylene chloride are prepared to obtain a dispersion solution.

(2) The solution was placed in an ozone absorption bottle and the bottle is immersed in a dry ice-methanol solution prepared to be −60° C. or lower.

(3) An ozone gas generated from an ozone generator is blown to the absorption bottle to add ozone.

(4) After adding ozone (the absorbing liquid becomes blue), excess ozone is removed by blowing air.

(5) In a beaker, a solution of 10% by mass of a reducing agent (sodium borohydride) and 90% by mass of methanol is prepared, and stirred with a magnetic stirrer. After dissolution, the absorbing liquid of (4) was placed thereto and stirred for 3 hours or longer.

(6) After stirring, a hydrochloric acid aqueous solution (1:1=hydrochloric acid:water) having a mass equivalent to ⅕ of the mass of the solution of (5) is added to the solution of (5), and the mixture is stirred for 3 hours or longer.

(7) After stirring, the mixture is transferred to a separatory funnel and separated into two layers. The lower layer is drained into an eggplant flask.

(8) The eggplant flask is set in a constant temperature bath at 65° C. and volatiles are distilled off using an evaporator.

(9) A residue in the eggplant flask is vacuum dried at 65° C. for 8 hours or longer to obtain a "graft chain dry sample".

[2] Quantification of Caprolactone Unit (CL)

Analysis was performed according to the following operations (1) and (2).

(1) The "graft chain dry sample" obtained by the operation of [1] was thermally decomposed at 500° C. under the following conditions 1) to 4), using a pyrolysis GC-MS (gas chromatography mass spectrometer) and a polymer composition ratio of the graft chain was measured.

1) A polar substance is analyzed by a strong polarity column, the column: trade name of "DP-FFAR, manufactured by Agilent Technologies, Inc., 30 m×0.25 mm×0.25 µm 2) Column flow rate: 1.0 mL/min 3) Injection port, interface temperature: 230° C.

4) Thermal decomposition temperature: 500° C.

(2) Composition analysis: It was confirmed that 2-hydroxyethyl methacrylate and ε-caprolactone were detected as degradation products of unsaturated fatty acid hydroxyalkyl ester-modified ε-caprolactone by pyrolysis at 500° C. using pyrolysis GC-MS. Since the caprolactone unit (CL) is detected as ε-caprolactone, a peak derived from ε-caprolactone was considered to correspond to CL. A copolymer of methyl methacrylate (MMA) and unsaturated fatty acid hydroxyalkyl ester-modified ε-caprolactone with a known composition ratio was used as a standard polymer for calculating the amount of CL. The standard polymer was prepared by emulsion polymerization, and a rate of polymerization was 99% or more. In addition, from molar mass of the unsaturated fatty acid hydroxyalkyl ester-modified ε-caprolactone (244.3 g/mol) and the molar mass of ε-caprolactone (114.1 g/mol), a mass ratio of CL in the standard polymer was calculated, and a calibration curve showing the ratio between MMA and CL was created. A correlation coefficient of the calibration curve was 0.99. The mass ratio of CL to 100 parts by mass of MMA in each sample was calculated using the calibration curve and was shown in Tables 8 to 10.

[Measurement of Particle Size]

Measurement was performed using a nano-particle size distribution measuring apparatus SALD-7100 (manufactured by Shimadzu Corporation).

[Measurement of Rate of Polymerization]

The rate of polymerization of the graft latex is measured by the following procedure.

(i) Mass (x) of the aluminum dish is measured to have a unit nearest 0.1 mg.

(ii) Approximately 1 g of polymer (X) latex is placed in an aluminum dish, and the mass (y) of the aluminum dish containing the polymer (X) latex is measured to have a unit nearest 0.1 mg.

(iii) The aluminum dish on which the polymer (X) latex is placed in a dryer at 180° C. and heated for 45 minutes.

(iv) The aluminum dish is removed from the dryer and cooled to 25° C. in a desiccator, and mass (z) thereof is measured to have a unit nearest 0.1 mg.

(v) A solid content concentration (%) of the polymer (X) latex is calculated based on the following equation.

Solid content concentration (%)={(z−x)/(y−x)}×100

(vi) A percentage (%) of the solid content concentration calculated by (v) with respect to the solid content concentration at the time of polymerization of all the monomers charged when producing the polymer (X) is set as a rate of polymerization at the time of production completion of graft latex.

Examples 1 to 5 and Comparative Examples 1 to 7

The rubber-containing graft polymer (A-1) obtained in Production Example 1 and polybutylene terephthalate resin ("NOVADURAN 5010R5" (trade name)), were blended with each other with a composition shown in Table 5, and mixed to obtain a mixture. This mixture was supplied to a devolatilization two-axis extruder (manufactured by Ikegai Iron Works Co., Ltd., PCM-30) heated to a barrel temperature of 260° C. and kneaded, and pellets of the resin composition of Example 1 in which 15% by mass of the rubber-containing graft polymer (A-1) was blended were produced.

Except that a kind and/or a using amount of the rubber-containing graft polymer and blending amount of another raw material were changed to conditions shown in Tables 5 to 7, pellets of each resin composition of Examples 2 to 9 and Comparative Examples 1 to 12 were produced in the same manner as in Example 1. As polybutylene terephthalate resin (PBT), "NOVADURAN 5010R5" (trade name) was used. As PC, aromatic polycarbonate ("lupilon S-2000F" (trade name), manufactured by Mitsubishi Engineering-Plastics Corporation, My of nominal Aromatic polycarbonate resin (Mv: 22000) was used. As styrene acrylonitrile resin (SAN), SAN-based resin "AP-H" (trade name), manufactured by Techno UMG Co., Ltd., nominal AN ratio is around 26%, and Mw of about 110,000) was used.

TABLE 5

|  | Example 1 | Example 2 | Comparative Example 1 | Comparative Example 2 |
|---|---|---|---|---|
| PBT | 85 | 85 | 85 | 85 |
| A-1 | 15 | | | |

TABLE 5-continued

|  | Example 1 | Example 2 | Comparative Example 1 | Comparative Example 2 |
|---|---|---|---|---|
| A-2 |  | 15 |  |  |
| B-1 |  |  | 15 |  |
| B-3 |  |  |  | 15 |

TABLE 6

|  | Example | | | Comparative Example | | | | |
|---|---|---|---|---|---|---|---|---|
|  | 3 | 4 | 5 | 3 | 4 | 5 | 6 | 7 |
| PBT | 36 | 36 | 36 | 36 | 36 | 36 | 36 | 36 |
| PC | 54 | 54 | 54 | 54 | 54 | 54 | 54 | 54 |
| A-1 | 10 |  |  |  |  |  |  |  |
| A-4 |  | 10 |  |  |  |  |  |  |
| A-5 |  |  | 10 |  |  |  |  |  |
| B-1 |  |  |  | 10 |  |  |  |  |
| B-2 |  |  |  |  | 10 |  |  |  |
| B-4 |  |  |  |  |  | 10 |  |  |
| B-6 |  |  |  |  |  |  | 10 |  |
| B-8 |  |  |  |  |  |  |  | 10 |

TABLE 7

|  | Example | | | | Comparative Example | | | | |
|---|---|---|---|---|---|---|---|---|---|
|  | 6 | 7 | 8 | 9 | 8 | 9 | 10 | 11 | 12 |
| SAN | 22.5 | 22.5 | 22.5 | 22.5 | 22.5 | 22.5 | 22.5 | 22.5 | 22.5 |
| PC | 70 | 70 | 70 | 70 | 70 | 70 | 70 | 70 | 70 |
| A-2 | 7.5 |  |  |  |  |  |  |  |  |
| A-3 |  | 7.5 |  |  |  |  |  |  |  |
| A-4 |  |  | 7.5 |  |  |  |  |  |  |
| A-5 |  |  |  | 7.5 |  |  |  |  |  |
| B-3 |  |  |  |  | 7.5 |  |  |  |  |
| B-5 |  |  |  |  |  | 7.5 |  |  |  |
| B-6 |  |  |  |  |  |  | 7.5 |  |  |
| B-7 |  |  |  |  |  |  |  | 7.5 |  |
| B-8 |  |  |  |  |  |  |  |  | 7.5 |

[Charpy Impact Test]

Each pellet was separately supplied to sumitomo injection molding machine SE100DU (manufactured by Sumitomo Heavy Industries, Ltd.), and a shaped article (test piece) having a length of 80 mm×a width of 10 mm×a thickness of 4 mm was obtained at a cylinder temperature of 260° C. and a mold temperature of 60° C.

A Charpy impact test was performed in accordance with ISO-179-1 and measurement was performed by cutting a TYPEA notch in accordance with ISO 2818.

[Tensile Test]

Each pellet was separately supplied to sumitomo injection molding machine SE100DU (manufactured by Sumitomo Heavy Industries, Ltd.), a multipurpose test piece (A1) shape determined by JIS-7139 was obtained by a single-point gate method at a cylinder temperature of 260° C. and a mold temperature of 60° C.

A tensile test was in accordance with ISO-527, and tension speed was set to 20 mm/min.

[Weld Strength]

Each pellet was separately supplied to sumitomo injection molding machine SE100DU (manufactured by Sumitomo Heavy Industries, Ltd.), a multipurpose test piece (A1) shape determined by JIS-7139 was obtained at a cylinder temperature of 260° C. and a mold temperature of 60° C.

At this time, a corresponding test piece was obtained according to the following procedure.

(1) Injection pressure and holding pressure during injection forming are adjusted at a two-point gate, and a test piece was produced such that a welding line is located at the middle of the test piece (FIG. 1a).

(2) The test piece of FIG. 1b was produced by increasing the holding pressure in (1) by 4 MPa.

A tensile test was in accordance with ISO-527, and tension speed was set to 20 mm/min.

The weld strength in an evaluation of the present invention is defined as elongation at break in the tensile test of the test piece shown in FIG. 1b.

[TEM Observation of Shaped Product]

Figure 2:
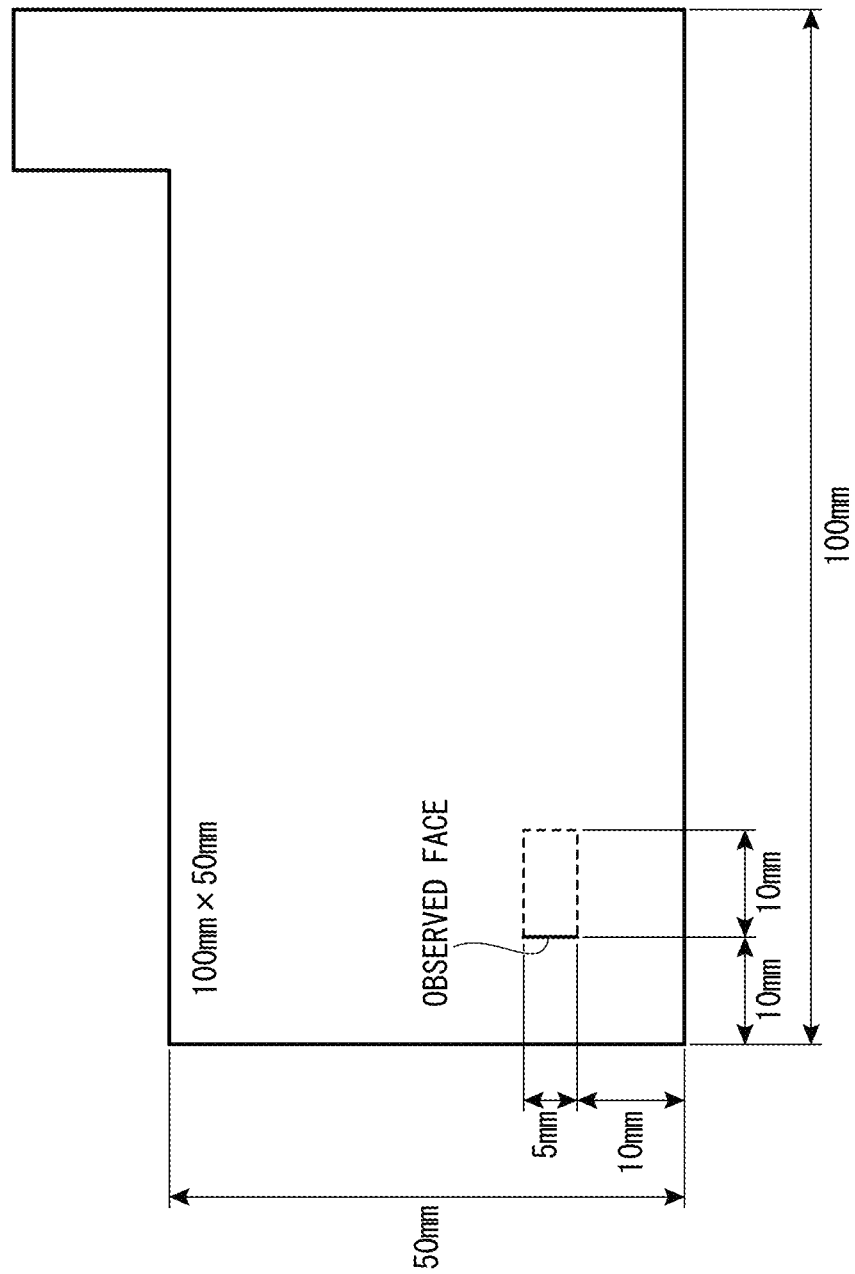
FIG. 2 is an overall view of a test piece used for TEM observation of a shaped article of the present invention, and a schematic view showing how to cut out the test piece from near an end.

Each pellet was separately supplied to sumitomo injection molding machine SE100DU (manufactured by Sumitomo Heavy Industries, Ltd.), and a shaped article (test piece) having a length of 100 mm×a width of 50 mm×a thickness of 2 mm was obtained at a cylinder temperature of 260° C. and a mold temperature of 60° C. As shown in FIG. 2, a specimen having a length of 10 mm×a width of 5 mm×a thickness of 2 mm was cut out from the test piece. The cut specimen was chamfered and trimmed with an ultramicrotome (product name: Leica EM UC7, manufactured by Leica Microsystems) so that a section near the center became a thin section in a section described as "observed face" in FIG. 2. The obtained specimen was dyed at 25° C. for 12 hours by being immersed in 2.0% by mass osmium tetroxide aqueous solution (manufactured by Wako Pure Chemical Industries, Ltd), and then a flake was cut out using the ultramicrotome under the conditions of a thin section thickness of 50 nm and cutting speed of 0.4 mm/sec and collected on a copper grid with a supporting film. The flake collected on the grid was dyed with 0.5% by mass ruthenium tetroxide aqueous solution (manufactured by Nissin EM Co., Ltd.) vapor at 25° C. for 10 minutes, and then observed with a transmission electron microscope (product name: H-7600, manufactured by Hitachi, Ltd.) under a condition of an acceleration voltage of 80 kV.

TABLE 8

|  |  |  | Example 1 | Example 2 | Comparative Example 1 | Comparative Example 2 |
|---|---|---|---|---|---|---|
| Thermoplastic resin | PBT (parts by mass) |  | 85 | 85 | 85 | 85 |
| Rubber-containing graft polymer | Production Example | A-1 (parts by mass) | 15 |  |  |  |
|  |  | A-2 (parts by mass) |  | 15 |  |  |
|  |  | B-1 (parts by mass) |  |  | 15 |  |
|  |  | B-3 (parts by mass) |  |  |  | 15 |
|  | Composition of graft chain |  | Ac-CL/MMA | Ac-CL/MMA | MMA | GMA/MMA |
|  | Kind of functional group |  | CL | CL | — | Epoxy group |
|  | Amount of functional groups [mmol/100 g] (Calculated value) |  | 4 | 23 | — | 23 |

TABLE 8-continued

|  |  | Example 1 | Example 2 | Comparative Example 1 | Comparative Example 2 |
|---|---|---|---|---|---|
|  | CL contained in graft chain relative to 100 parts by mass of component having glass transition temperature (Tg) of 60° C. or higher | 2 | 10 | — | — |
|  | Particle size of rubber [nm] | 230 | 230 | 230 | 230 |
| Resin composition | Charpy impact strength [kJ/m²] 23° C. | 15 | 16 | 14 | 8 |
|  | 0° C. | 11 | 13 | 11 | 7 |

PBT: Polybutylene terephthalate resin ("NOVADURAN (registered trademark) 5010R5")
Ac-CL: Unsaturated fatty acid hydroxyalkyl ester-modified ε-caprolactone (registered trademark) "Placcel FM-1" (manufactured by Daicel Corporation)
CL: Caprolactone unit
MMA: Methyl methacrylate
GMA: Glycidyl methacrylate

TABLE 9

|  |  |  | Example | | | Comparative Example | | | | |
|---|---|---|---|---|---|---|---|---|---|---|
|  |  |  | 3 | 4 | 5 | 3 | 4 | 5 | 6 | 7 |
| Thermoplastic resin | PBT (parts by mass) | | 36 | 36 | 30 | 36 | 36 | 36 | 36 | 36 |
|  | PC (parts by mass) | | 54 | 54 | 54 | 54 | 54 | 54 | 54 | 54 |
| Rubber-containing graft polymer | Production Example | A-1 (parts by mass) | 10 | | | | | | | |
|  |  | A-4 (parts by mass) | | 10 | | | | | | |
|  |  | A-5 (parts by mass) | | | 10 | | | | | |
|  |  | B-1 (parts by mass) | | | | 10 | | | | |
|  |  | B-2 (parts by mass) | | | | | 10 | | | |
|  |  | B-4 (parts by mass) | | | | | | 10 | | |
|  |  | B-6 (parts by mass) | | | | | | | 10 | |
|  |  | B-8 (parts by mass) | | | | | | | | 10 |
|  | Composition of graft chain | | Ac-CL/ MMA | Ac-CL/ MMA | Ac-CL/ MMA | MMA | GMA/ MMA | HEMA/ MMA | MMA | MMA |
|  | Kind of functional group | | CL | CL | CL | — | Epoxy group | Hydroxyl group | — | — |
|  | Amount of functional groups [mmol/100 g] (Calculated value) | | 4 | 4 | 4 | — | 4 | 4 | — | — |
|  | CL contained in graft chain relative to 100 parts by mass of component having glass transition temperature (Tg) of 60° C. or higher | | 2 | 3 | 3 | — | — | — | — | — |
|  | Particle size of rubber [nm] | | 230 | 170 | 210 | 230 | 230 | 230 | 170 | 210 |
| Resin composition | Tensile properties | Breaking strength [MPa] | 57 | 49 | 37 | 44 | 48 | 58 | 35 | 36 |
|  |  | Elongation at break [%] | 162 | 131 | 102 | 75 | 111 | 150 | 60 | 100 |
|  | Weld strength (FIG. 1b) | Elongation at break [%] | 7.5 | 38.2 | 4.8 | 5.9 | 6.3 | 6.5 | 24.4 | 3.9 |
|  |  | Standard deviation [—] | 0.2 | 1.8 | 0.1 | 0.2 | 0.0 | 0.1 | 4.0 | 0.1 |

PBT: Polybutylene terephthalate resin ((registered trademark) "NOVADURAN 5010R5")
PC: Aromatic polycarbonate resin ((registered trademark) "Iupilon S-2000F")
Ac-CL: Unsaturated fatty acid hydroxyalkyl ester-modified ε-caprolactone (registered trademark) "Placcel FM-1" (manufactured by Daicel Corporation)
CL: Caprolactone unit
MMA: Methyl methacrylate
GMA: Glycidyl methacrylate
HEMA: 2-hydroxyethyl methacrylate

TABLE 10

|  |  |  | Example | | | | Comparative Example | | | | |
|---|---|---|---|---|---|---|---|---|---|---|---|
|  |  |  | 6 | 7 | 8 | 9 | 8 | 9 | 10 | 11 | 12 |
| Thermoplastic resin | SAN (parts by mass) | | 22.5 | 22.5 | 22.5 | 22.5 | 22.5 | 22.5 | 22.5 | 22.5 | 22.5 |
|  | PC (parts by mass) | | 70 | 70 | 70 | 70 | 70 | 70 | 70 | 70 | 70 |
| Rubber-containing graft polymer | Production Example | A-2 (parts by mass) | 7.5 | | | | | | | | |
|  |  | A-3 (parts by mass) | | 7.5 | | | | | | | |
|  |  | A-4 (parts by mass) | | | 7.5 | | | | | | |
|  |  | A-5 (parts by mass) | | | | 7.5 | | | | | |
|  |  | B-3 (parts by mass) | | | | | 7.5 | | | | |
|  |  | B-5 (parts by mass) | | | | | | 7.5 | | | |

TABLE 10-continued

|  |  | Example | | | | Comparative Example | | | | |
| --- | --- | --- | --- | --- | --- | --- | --- | --- | --- | --- |
|  |  | 6 | 7 | 8 | 9 | 8 | 9 | 10 | 11 | 12 |
|  | B-6 (parts by mass) |  |  |  |  |  |  | 7.5 |  |  |
|  | B-7 (parts by mass) |  |  |  |  |  |  |  | 7.5 |  |
|  | B-8 (parts by mass) |  |  |  |  |  |  |  |  | 7.5 |
|  | Composition of graft chain | Ac-CL/MMA | Ac-CL/MMA | Ac-CL/MMA | Ac-CL/MMA | GMA/MMA | MMA | MMA | St-AN | MMA |
|  | Kind of functional group | CL | CL | CL | CL | Epoxy group | — | — | — | — |
|  | Amount of functional groups [mmol/100 g] (Calculated value) | 23 | 8 | 4 | 4 | 23 | — | — | — | — |
|  | CL contained in graft chain relative to 100 parts by mass of component having glass transition temperature (Tg) of 60° C. or higher | 10 |  | 3 | 3 | — | — | — | — | — |
|  | Particle size of rubber [nm] | 230 | 230 | 170 | 210 | 230 | 230 | 170 | 170 | 210 |
| Resin composition | Charpy impact strength [kJ/m$^2$] 23° C. | 65 | 59 | 52 | 94 | 24 | 58 | 54 | 54 | 73 |
|  | −30° C. | 17 | 18 | 41 | 21 | 9 | 19 | 32 | 30 | 22 |
|  | Tensile strength Maximum strength [MPa] | 56 | 64 | 55 | 56 | 55 | 57 | 56 | 55 | 54 |

SAN: Styrene acrylonitrile resin ("AP-H")
PC: Aromatic polycarbonate resin ((registered trademark) "Iupilon S-2000F")
Ac-CL: Unsaturated fatty acid hydroxyalkyl ester-modified ε-caprolactone (registered trademark) "Placcel FM-1" (manufactured by Daicel Corporation)
CL: Caprolactone unit
MMA: Methyl methacrylate
St-AN: Copolymer of styrene and acrylonitrile As a result of composition analysis of the organic solvent extract (fw) after the cryogrinding or the organic solvent extract (ow) after the ozone addition reaction, the caprolactone unit was detected. Therefore, it can be said that the rubber-containing graft polymer (A) of the present invention contains the caprolactone unit (CL) derived from the unsaturated fatty acid hydroxyalkyl ester-modified ε-caprolactone represented by Formula (3) in the graft chain bonded to the rubbery polymer.

In a case where the rubber-containing graft polymer having the caprolactone unit (CL) in the graft chain was used, impact strength, tensile strength, and weld strength improved in all matrix resins, compared to a case where a rubber-containing graft polymer having no functional group was used. In addition, the caprolactone unit (CL) is present in the graft chain in all rubber kinds of the acrylic rubber-containing graft polymer, the diene-based rubber-containing graft polymer, and the Si-based rubber-containing graft polymer (A-10), thereby improving mechanical property. Therefore, it can be seen that the improvement in the strength developability of the thermoplastic resin by the rubber-containing graft polymer (A) of the present invention is not limited by a kind of rubber.

In addition, in a case where the acrylic rubber-containing graft polymer (A-1 to A-3) having the caprolactone unit (CL) in the graft chain was used, impact strength, tensile strength, and weld strength improved, compared to the rubber-containing graft polymer (B-2, B-3) having an epoxy group derived from glycidyl methacrylate in the graft chain. In the rubber-containing graft polymer containing glycidyl methacrylate, the terminal epoxy group is considered to be chemically bonded to a polyester resin or a polycarbonate resin. However, it is considered that since crosslinking is generated by the epoxy group during shaping, the mechanical strength was reduced.

When referring to Example 3 and Comparative Example 5, the rubber-containing graft polymer (A-1) having the caprolactone unit (CL) in the graft chain was superior in weld strength, compared to the rubber-containing graft polymer (B-4) having 2-hydroxyethyl methacrylate. This is considered to be due to the difference in reactivity of a hydroxyl group present at the end of a side chain of the graft chain. It is considered that since the rubber-containing graft polymer (A-1) having the caprolactone unit (CL) in the graft chain has a terminal hydroxyl group derived from unsaturated fatty acid hydroxyalkyl ester-modified ε-caprolactone at a position away from the main chain skeleton, but the hydroxyl group of 2-hydroxyethyl methacrylate is located near the main chain skeleton of the graft chain, the reactivity is inferior. It is considered that when the hydroxyl group of the graft chain reacts with the matrix resin, the rubber-containing graft polymer (A) is easily dispersed uniformly in the matrix resin, therefore, in the rubber-containing graft polymer (A-1) having the caprolactone unit (CL) having excellent reactivity, the weld strength improved.

Figure 3:
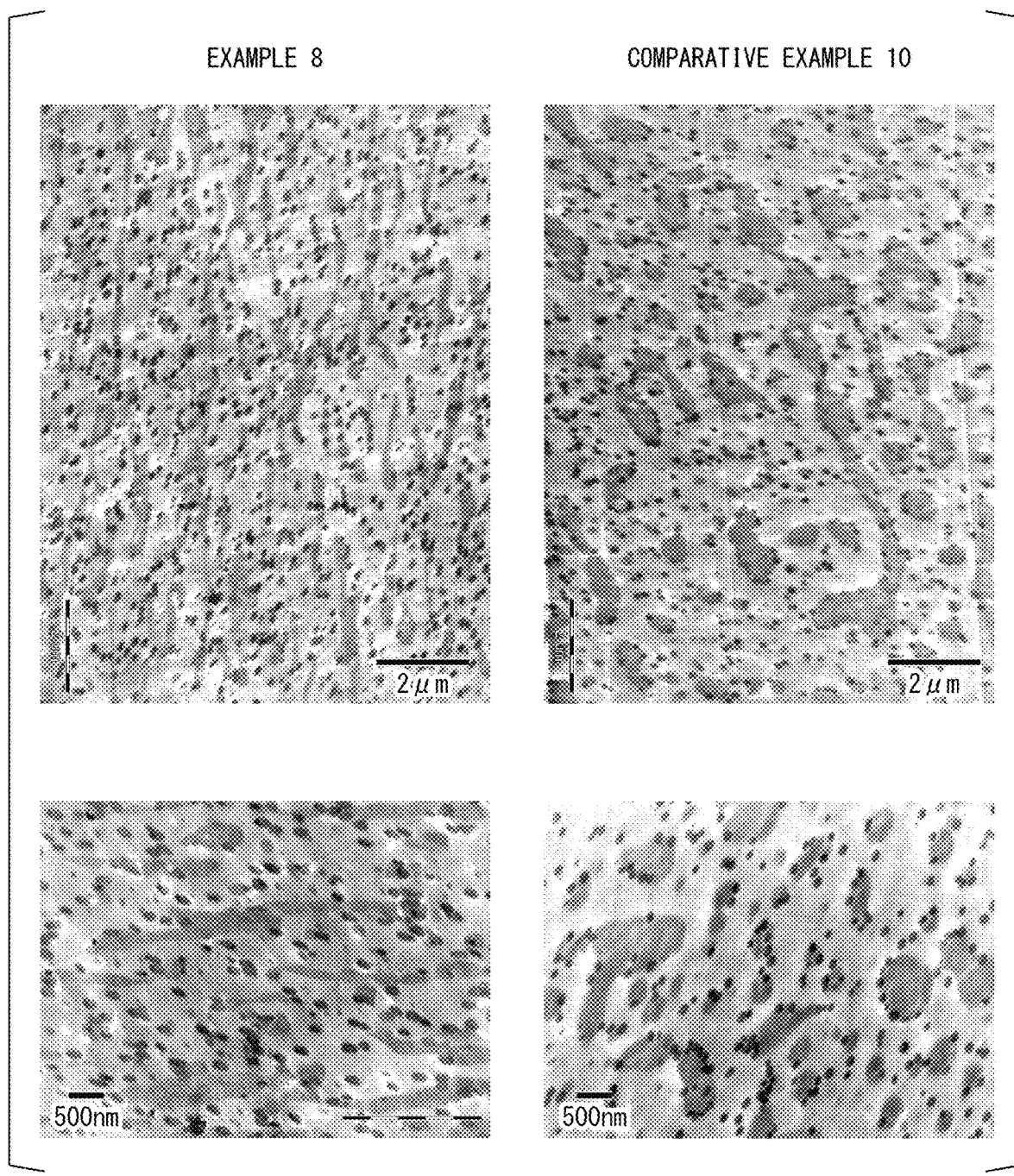
FIG. 3 is a diagram showing results of TEM observation using pellets of Example 8 and Comparative Example 10.

In FIG. 3, results of TEM observation of resins respectively obtained in Example 8 and Comparative Example 10 were summarized. A phase diagram in which sea is an aromatic polycarbonate and an island is a styrene acrylonitrile resin shows in which phase a circular rubber dyed black is disposed. The rubber derived from the rubber-containing graft polymer (B-6) in the resin composition obtained in Comparative Example 10 was localized at the phase interface between the aromatic polycarbonate and the styrene acrylonitrile resin. On the other hand, the rubber derived from the rubber-containing graft polymer (A-4) in the resin composition obtained in Example 8 is uniformly dispersed in the matrix resin. From the fact that low-temperature impact strength of Example 8 was superior compared to that of Comparative Example 10, it can be said that the more uniformly dispersed rubber, the higher the impact strength. In FIG. 3, the rubber is more uniformly dispersed in Example 8 than in Comparative Example 10, and is present on the aromatic polycarbonate side. In addition, phase separation derived from the styrene acrylonitrile resin is also finely and uniformly dispersed. The aromatic polycarbonate is softer than the styrene acrylonitrile resin. Therefore, it is considered that aromatic polycarbonate is first deformed in a case where stress is applied. Therefore, it is considered preferable that the rubber is uniformly dispersed on the aromatic polycarbonate side in that the volume strain caused by the deformation is reduced by the cavitation of the rubber. In addition, it is considered that since the phase separation derived from the styrene acrylonitrile resin is also finely and uniformly dispersed, the impact strength is also high.

The invention claimed is:

1. A rubber-containing graft polymer which is obtained by emulsion graft polymerization of 5% to 50% by mass of a monomer for grafting (b) comprising a vinyl monomer (f-1) represented by Formula (1) to 50% to 95% by mass of rubber latex, $$CH_2=CR^1COO(CH_2)_qO[CO(CH_2)_mO]_nH \qquad (1)$$

wherein in the formula, $R^1$ represents hydrogen or a methyl group, q represents an integer of 2 to 5, m represents an integer of 3 to 10, and n represents an integer of 1 to 10, and wherein a particle size distribution Dv/Dn of the rubber latex is 1.5 or less, wherein Dv is a volume average particle size, and Dn is a number average particle size.

2. The rubber-containing graft polymer according to claim 1, wherein the vinyl monomer (f-1) is a vinyl monomer (f-2) represented by Formula (2), $$CH_2=CR^2COO(CH_2)_qO[CO(CH_2)_5O]_nH \qquad (2)$$

in the formula, $R^2$ represents hydrogen or a methyl group, q represents an integer of 2 to 5, and n represents an integer of 1 to 5.

3. The rubber-containing graft polymer according to claim 1, wherein the monomer for grafting (b) comprises methyl methacrylate.

4. The rubber-containing graft polymer according to claim 1, wherein an amount of the vinyl monomer (f-1) is 0.5% to 50% by mass with respect to 100% by mass of the rubber-containing graft polymer.

5. The rubber-containing graft polymer according to claim 1, wherein a particle size of the rubber to be grafted is 50 to 400 nm.

6. A resin composition containing a rubber-containing graft polymer, the composition comprising:
the rubber-containing graft polymer according to claim 1; and
a thermoplastic resin (B).

7. The resin composition containing a rubber-containing graft polymer according to claim 6, wherein the thermoplastic resin (B) is a polyester resin.

8. The resin composition containing a rubber-containing graft polymer according to claim 6, wherein the thermoplastic resin (B) is an alloy of an aromatic polycarbonate resin and a polyester resin.

9. The resin composition containing a rubber-containing graft polymer according to claim 6, wherein the thermoplastic resin (B) is an alloy of an aromatic polycarbonate resin and a styrene-based resin.

10. A shaped article which is obtained by shaping the resin composition containing a rubber-containing graft polymer according to claim 6.

11. The shaped article according to claim 10, which is an injection shaped article.

* * * * *